United States Patent
Ogita et al.

(10) Patent No.: US 11,138,984 B2
(45) Date of Patent: Oct. 5, 2021

(54) INFORMATION PROCESSING APPARATUS AND INFORMATION PROCESSING METHOD FOR GENERATING AND PROCESSING A FILE INCLUDING SPEECH WAVEFORM DATA AND VIBRATION WAVEFORM DATA

(71) Applicant: SONY CORPORATION, Tokyo (JP)

(72) Inventors: Takeshi Ogita, Tokyo (JP); Ayumi Nakagawa, Kanagawa (JP); Ikuo Yamano, Tokyo (JP); Yusuke Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 198 days.

(21) Appl. No.: 16/342,125

(22) PCT Filed: Oct. 23, 2017

(86) PCT No.: PCT/JP2017/038118
§ 371 (c)(1),
(2) Date: Apr. 15, 2019

(87) PCT Pub. No.: WO2018/105254
PCT Pub. Date: Jun. 14, 2018

(65) Prior Publication Data
US 2019/0287544 A1    Sep. 19, 2019

(30) Foreign Application Priority Data

Dec. 5, 2016  (JP) .............................. JP2016-235574

(51) Int. Cl.
*G10L 19/02*   (2013.01)
*G10L 19/018*  (2013.01)
(Continued)

(52) U.S. Cl.
CPC ............ *G10L 19/0204* (2013.01); *G06F 3/01* (2013.01); *G10L 19/00* (2013.01); *G10L 19/018* (2013.01);
(Continued)

(58) Field of Classification Search
CPC ....... H04M 1/00; H04N 21/235; G10L 19/00; G10L 19/018; G10L 19/0204;
(Continued)

(56) References Cited

U.S. PATENT DOCUMENTS 5,510,828 A * 4/1996 Lutterbach .............. G09F 27/00
340/901
5,521,631 A * 5/1996 Budow .................. H04N 7/162
348/E7.06

(Continued)

FOREIGN PATENT DOCUMENTS

CN   101416139 A   4/2009
CN   104049889 A   9/2014
(Continued)

OTHER PUBLICATIONS

English Translation of International Preliminary Report on Patentability Chapter I for PCT/JP2017/038118, dated Jun. 11, 2019 (Year: 2019).*

(Continued)

*Primary Examiner* — Eric Yen
(74) *Attorney, Agent, or Firm* — Chip Law Group

(57) ABSTRACT

Provided is an information processing apparatus including a file generation unit that generates a file including speech waveform data and vibration waveform data. The file generation unit cuts out waveform data in a to-be-synthesized band from first speech data, synthesizes waveform data extracted from a synthesizing band of vibration data with the
(Continued)

to-be-synthesized band to generate second speech data, and encodes the second speech data to generate the file.

20 Claims, 16 Drawing Sheets

(51) Int. Cl.
*G06F 3/01* (2006.01)
*H04M 1/00* (2006.01)
*H04N 21/235* (2011.01)
*G10L 19/00* (2013.01)
*G10L 21/0272* (2013.01)
*G10L 21/16* (2013.01)
*G10L 21/18* (2013.01)

(52) U.S. Cl.
CPC .......... *G10L 21/0272* (2013.01); *G10L 21/16* (2013.01); *G10L 21/18* (2013.01); *H04M 1/00* (2013.01); *H04N 21/235* (2013.01)

(58) Field of Classification Search
CPC ......... G10L 21/06; G10L 21/16; G10L 21/18; G10L 21/0272; G06F 3/01
See application file for complete search history.

(56) References Cited

U.S. PATENT DOCUMENTS

| | | | | |
|---|---|---|---|---|
| 5,825,771 A * | 10/1998 | Cohen | ................... | H04L 65/607 370/394 |
| 5,956,674 A * | 9/1999 | Smyth | ................... | G10L 19/0208 704/200.1 |
| 6,154,531 A * | 11/2000 | Clapper | ................. | H04M 1/576 379/102.03 |
| 6,415,251 B1 * | 7/2002 | Oikawa | ............... | G10L 19/0208 704/200.1 |
| 7,099,848 B1 * | 8/2006 | Bratton | ................... | G06F 21/10 345/671 |
| 7,194,753 B1 * | 3/2007 | Fries | ................. | H04N 21/4622 725/38 |
| 2001/0005173 A1 * | 6/2001 | Snyder | ................. | G10L 19/0212 341/123 |
| 2002/0085737 A1 * | 7/2002 | Kitamura | ............... | G06T 1/0021 382/100 |
| 2003/0011627 A1 * | 1/2003 | Yager | ........................ | G06F 3/14 715/700 |
| 2003/0028381 A1 * | 2/2003 | Tucker | ................... | H04H 20/31 704/273 |
| 2003/0054842 A1 * | 3/2003 | Riedl | ..................... | H04M 11/06 455/462 |
| 2003/0233234 A1 * | 12/2003 | Truman | ................ | G10L 19/035 704/203 |
| 2004/0022375 A1 * | 2/2004 | Rodman | ............... | H04M 3/567 379/90.01 |
| 2004/0044824 A1 * | 3/2004 | Haneda | ................... | G10L 19/00 711/1 |
| 2004/0243817 A1 * | 12/2004 | Hasegawa | ............ | G11B 27/034 713/193 |
| 2005/0004690 A1 * | 1/2005 | Zhang | ................... | G11B 27/105 700/94 |
| 2006/0010500 A1 * | 1/2006 | Elazar | ................ | H04N 21/8355 726/27 |
| 2007/0236449 A1 * | 10/2007 | Lacroix | ................... | G06F 3/016 345/156 |
| 2009/0013855 A1 * | 1/2009 | Fujishima | ............ | G10H 1/0025 84/604 |
| 2009/0147963 A1 * | 6/2009 | Smith | ...................... | H04R 3/04 381/62 |
| 2009/0240504 A1 * | 9/2009 | Pang | ........................ | G10L 19/24 704/500 |
| 2010/0067810 A1 * | 3/2010 | Kishi | ..................... | H04N 19/86 382/232 |
| 2012/0010891 A1 * | 1/2012 | Kim | ....................... | G10L 19/008 704/500 |
| 2013/0154930 A1 * | 6/2013 | Xiang | ..................... | G06F 3/167 345/158 |
| 2013/0162905 A1 * | 6/2013 | Matsumoto | ........ | H04N 21/4394 348/521 |
| 2014/0105390 A1 * | 4/2014 | Chen | ..................... | H04W 12/02 380/200 |
| 2014/0270681 A1 | 9/2014 | Sen et al. | | |
| 2014/0340209 A1 * | 11/2014 | Lacroix | ................... | H04R 3/14 340/407.2 |
| 2015/0273322 A1 * | 10/2015 | Nakagawa | ............ | A63F 13/285 463/37 |
| 2015/0325115 A1 | 11/2015 | Wardle et al. | | |
| 2015/0325116 A1 | 11/2015 | Umminger, III | | |
| 2016/0214007 A1 * | 7/2016 | Yamashita | ............. | A63F 13/92 |
| 2017/0136354 A1 | 5/2017 | Yamano et al. | | |
| 2018/0146245 A1 * | 5/2018 | Petrovic | ............. | H04N 21/8358 |

FOREIGN PATENT DOCUMENTS

| | | |
|---|---|---|
| CN | 104063056 A | 9/2014 |
| CN | 106662915 A | 5/2017 |
| EP | 2002323 A2 | 12/2008 |
| EP | 2778901 A1 | 9/2014 |
| EP | 3140718 A1 | 3/2017 |
| JP | 2009-532808 A | 9/2009 |
| JP | 5025721 B2 | 9/2012 |
| JP | 2012-230690 A | 11/2012 |
| JP | 2014-182816 A | 9/2014 |
| JP | 2015-185137 A | 10/2015 |
| JP | 2015-231098 A | 12/2015 |
| JP | 2017-515240 A | 6/2017 |
| KR | 10-2008-0109907 A | 12/2008 |
| KR | 10-2014-0113567 A | 9/2014 |
| WO | 2007/117649 A2 | 10/2007 |
| WO | 2015/171452 A1 | 11/2015 |
| WO | 2015/186394 A1 | 12/2015 |

OTHER PUBLICATIONS

English Translation of the Written Opinion of the International Search Authority for PCT/JP2017/038118, dated Jun. 5, 2019 (Year: 2019).*
European search opinion for EP 17879382, dated Nov. 20, 2019 (Year: 2019).*
Supplementary European search report for EP 17879382, dated Nov. 20, 2019 (Year: 2019).*
Wang, H., Wang, W., Chen, M., & Yao, X., "Quality-driven secure audio transmissions in wireless multimedia sensor networks.", 2013, Multimedia Tools and Applications, 67(1), 119-135. doi:http://dx.doi.org/10.1007/s11042-011-0928-5 (Year: 2013).*
International Search Report and Written Opinion of PCT Application No. PCT/JP2017/038118, dated Jan. 16, 2018, 09 pages of ISRWO.

* cited by examiner

FIG. 1B
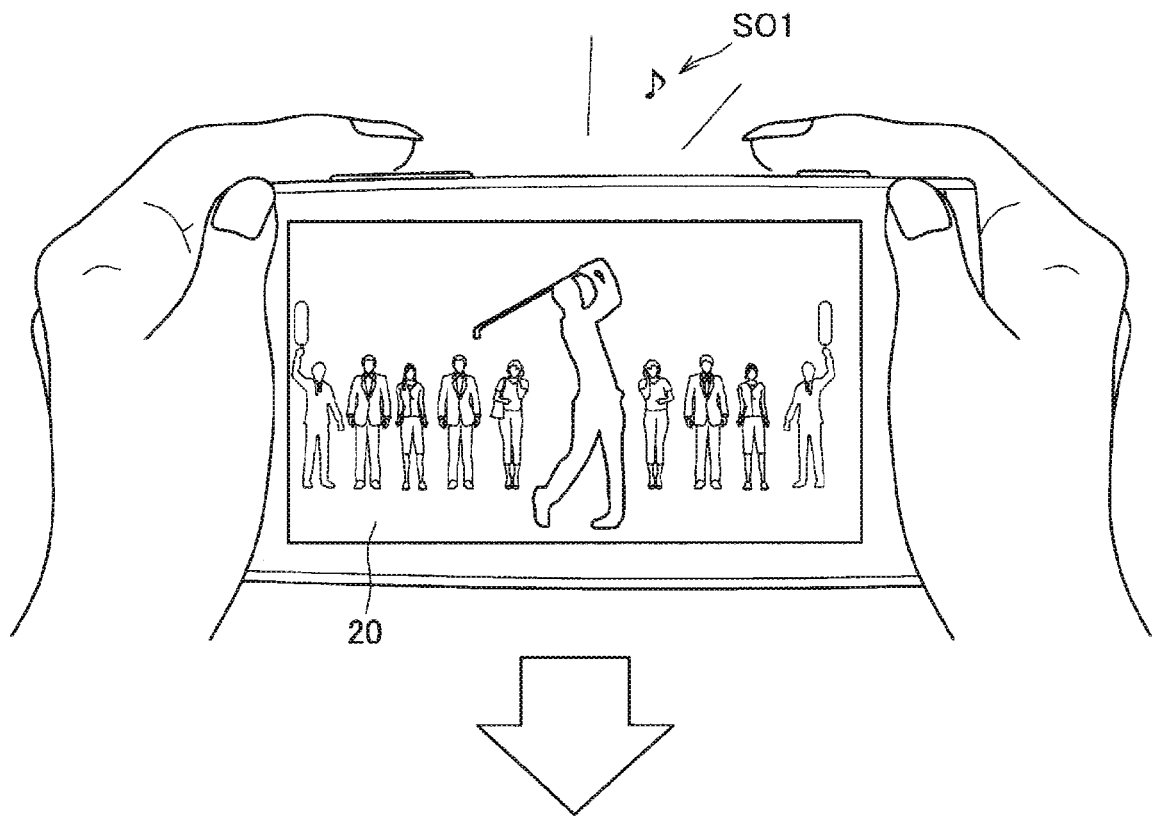
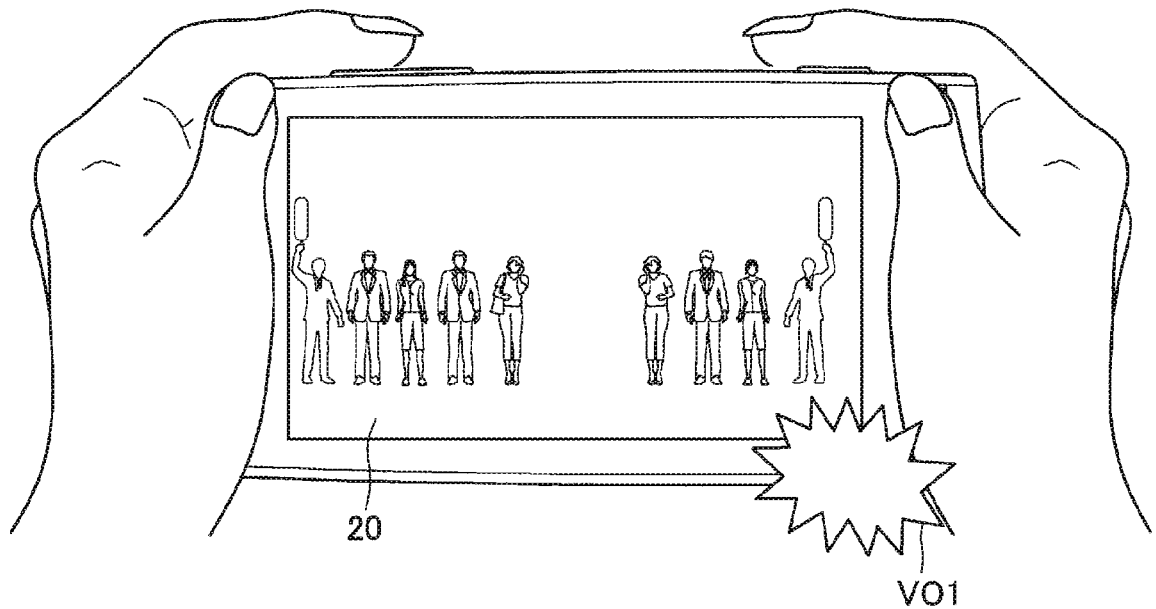

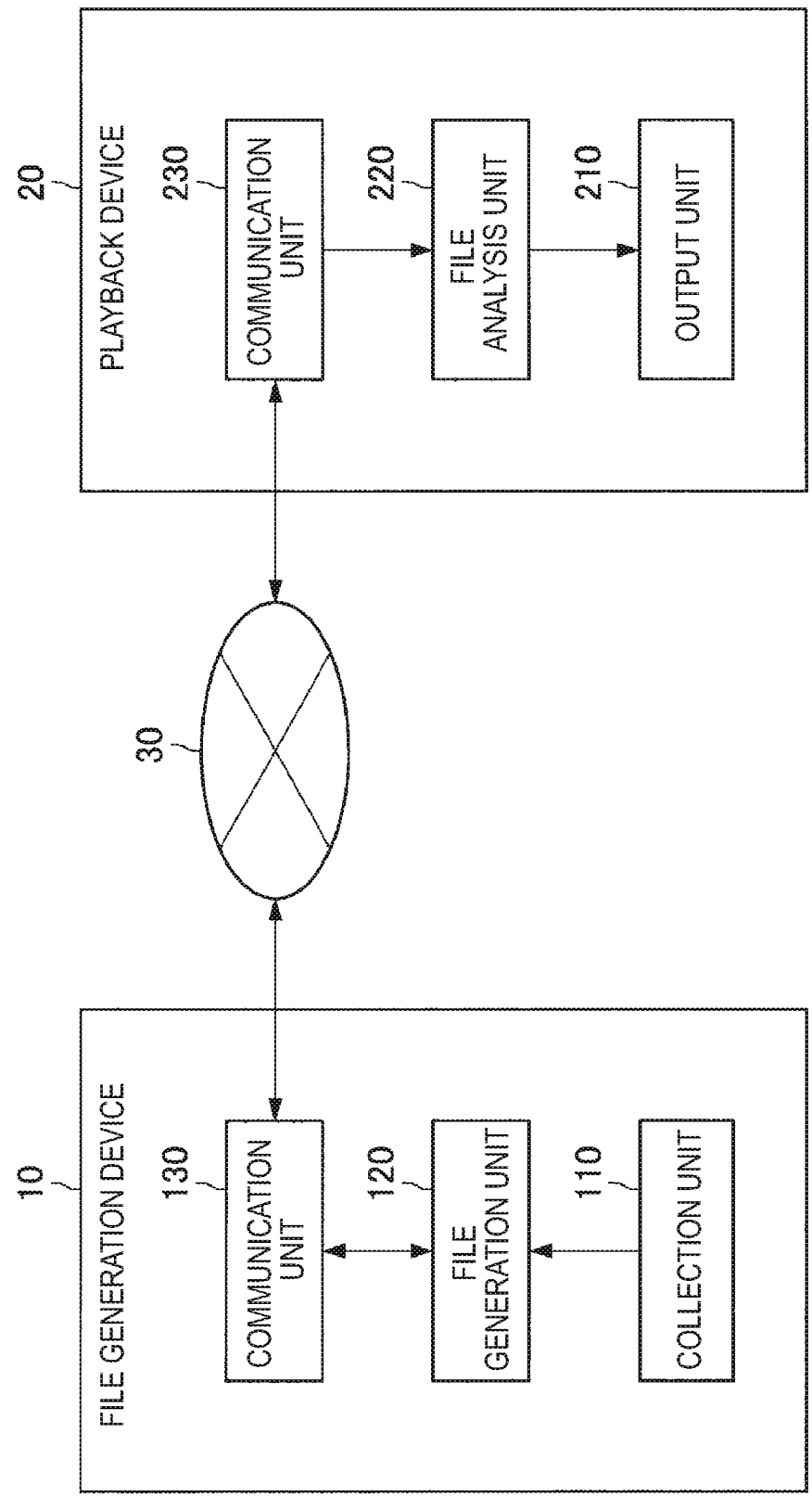

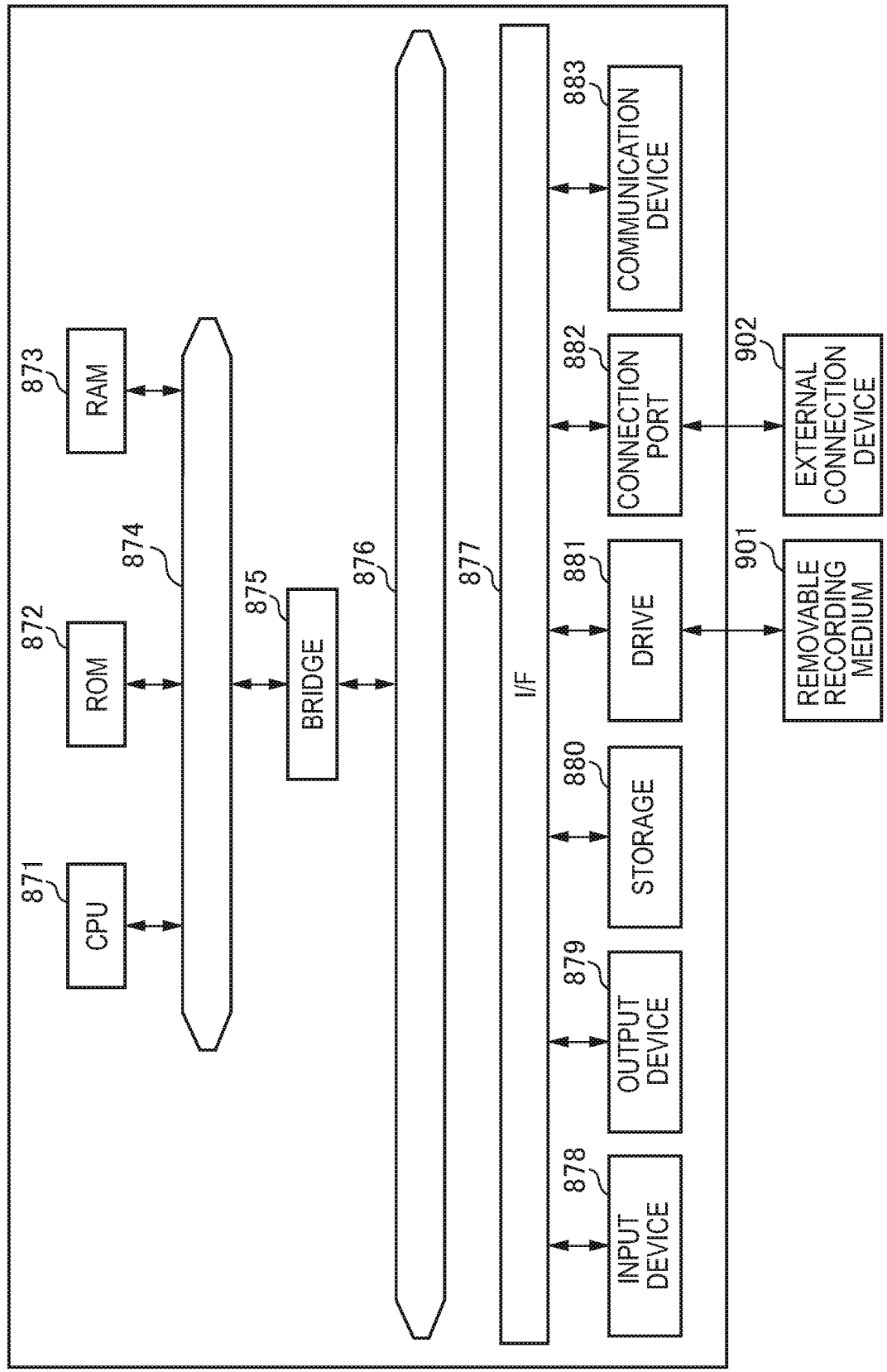

INFORMATION PROCESSING APPARATUS AND INFORMATION PROCESSING METHOD FOR GENERATING AND PROCESSING A FILE INCLUDING SPEECH WAVEFORM DATA AND VIBRATION WAVEFORM DATA

CROSS REFERENCE TO RELATED APPLICATIONS

This application is a U.S. National Phase of International Patent Application No. PCT/JP2017/038118 filed on Oct. 23, 2017, which claims priority benefit of Japanese Patent Application No. JP 2016-235574 filed in the Japan Patent Office on Dec. 5, 2016. Each of the above-referenced applications is hereby incorporated herein by reference in its entirety.

TECHNICAL FIELD

The present disclosure relates to an information processing apparatus, an information processing method, and a program.

BACKGROUND ART

Various devices for generating vibration are developed nowadays. In addition, a device equipped with the device as described above and using vibration as one of information transmission means becomes widespread. In one example, Patent Literature 1 discloses a technique of presenting internal information of a terminal to a user by vibration.

CITATION LIST

Patent Literature

Patent Literature 1: JP 2010-136151A

DISCLOSURE OF INVENTION

Technical Problem

Meanwhile, the device using vibration as described above is also conceived to perform communication regarding vibration information with other devices, in addition to processing that is completed within the device as described in Patent Literature 1. However, the communication relating to vibration information has not been standardized yet, and in a case where vibration information is transmitted and received together with speech information and moving image information, data communication traffic is conceived to increase.

In view of this, the present disclosure provides a novel and improved information processing apparatus, information processing method, and program, capable of implementing unified communication of vibration information while reducing data communication traffic.

Solution to Problem

According to the present disclosure, there is provided an information processing apparatus including: a file generation unit configured to generate a file including speech waveform data and vibration waveform data. The file generation unit cuts out waveform data in a to-be-synthesized band from first speech data, synthesizes waveform data extracted from a synthesizing band of vibration data with the to-be-synthesized band to generate second speech data, and encodes the second speech data to generate the file.

In addition, according to the present disclosure, there is provided an information processing method including: generating, by a processor, a file including speech waveform data and vibration waveform data. The generating the file further includes cutting out waveform data in a to-be-synthesized band from first speech data, synthesizing waveform data extracted from a synthesizing band of vibration data with the to-be-synthesized band to generate second speech data, and encoding the second speech data to generate the file.

In addition, according to the present disclosure, there is provided a program causing a computer to function as an information processing apparatus including: a file generation unit configured to generate a file including speech waveform data and vibration waveform data. The file generation unit cuts out waveform data in a to-be-synthesized band from first speech data, synthesizes waveform data extracted from a synthesizing band of vibration data with the to-be-synthesized band to generate second speech data, and encodes the second speech data to generate the file.

In addition, according to the present disclosure, there is provided an information processing apparatus including: a file analysis unit configured to acquire speech waveform data and vibration waveform data from a file including the speech waveform data and the vibration waveform data. The file analysis unit separates speech data obtained by decoding the file on the basis of a to-be-synthesized band to acquire the speech waveform data and the vibration waveform data.

In addition, according to the present disclosure, there is provided an information processing method including: acquiring, by a processor, speech waveform data and vibration waveform data from a file including the speech waveform data and the vibration waveform data. The acquiring further includes separating speech data obtained by decoding the file on the basis of a to-be-synthesized band to acquire the speech waveform data and the vibration waveform data.

In addition, according to the present disclosure, there is provided a program causing a computer to function as an information processing apparatus including: a file analysis unit configured to acquire speech waveform data and vibration waveform data from a file including the speech waveform data and the vibration waveform data. The file analysis unit separates speech data obtained by decoding the file on the basis of a to-be-synthesized band to acquire the speech waveform data and the vibration waveform data.

Advantageous Effects of Invention

According to the present disclosure as described above, it is possible to implement unified communication of vibration information while reducing data communication traffic.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1B is a diagram illustrated to describe synchronization between vibration information and speech and moving image information.

FIG. 2 is a diagram illustrating a system configuration example according to an embodiment of the present disclosure.

FIG. 15 is a hardware configuration example according to the present disclosure.

MODE(S) FOR CARRYING OUT THE INVENTION

Figure 1A:
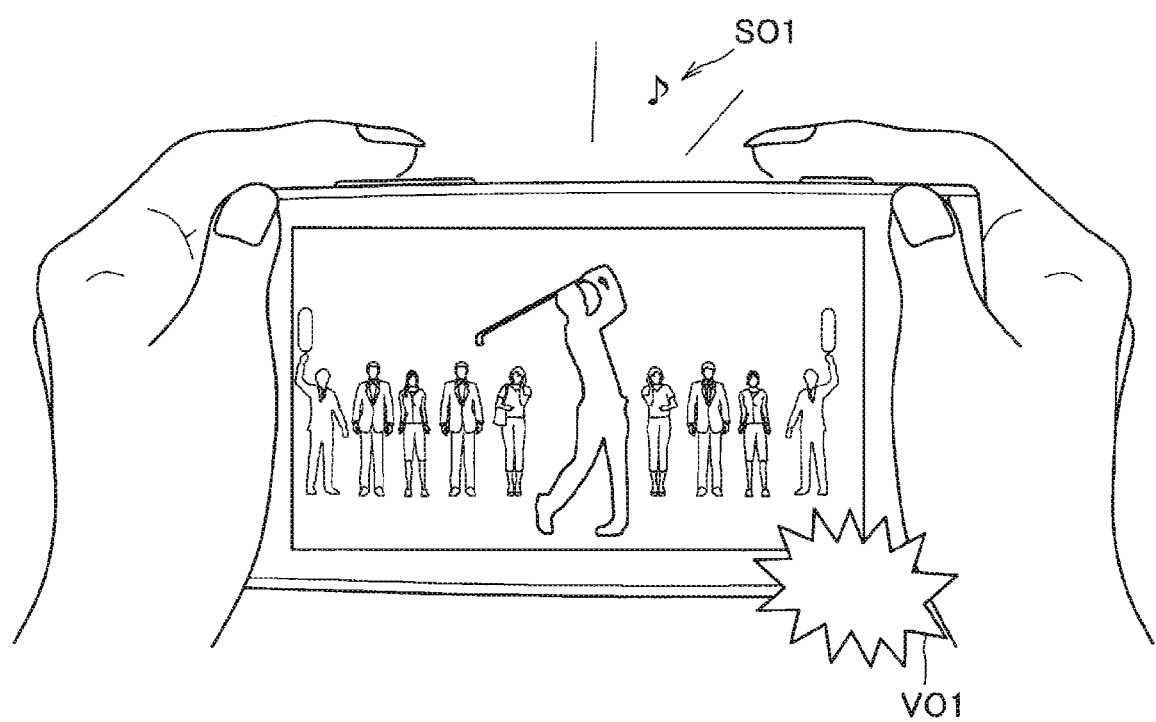
FIG. 1A is a diagram illustrated to describe synchronization between vibration information and speech and moving image information.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the following order.
1. Embodiment
1.1. Overview of embodiment
1.2. System configuration example
1.3. Functional configuration example of file generation device 10
1.4. Functional configuration example of playback device 20
1.5. Details on file generation and file analysis
1.6. Modification of to-be-synthesized band
1.7. Operations of file generation device 10 and playback device 20
2. Hardware configuration example
3. Concluding remarks 1. Embodiment 1.1. Overview of Embodiment An overview of an embodiment of the present disclosure is now described. As described above, various devices that generate vibration are used nowadays, and many vibration devices intended for mobile terminals are developed. Furthermore, a linear resonant actuator (LRA), a piezoelectric (voltage) actuator, or the like capable of reproducing various vibration patterns is also widespread nowadays, and so it is conceived that communication of vibration information would be actively progressed from now on.

While, the communication of vibration information has not been standardized yet, unlike the communication of speech information and image information. For this reason, a format for allowing vibration information to transmitting and receiving easily is necessary. However, in a case of newly generating a vibration format, it is important to synchronize vibration information with the speech information and moving image information transmitted and received simultaneously with the vibration information.

FIGS. 1A and 1B are diagrams illustrated to describe synchronization between the vibration information and the speech and moving image information. FIG. 1A illustrates a moving image obtained by capturing a golf shot and speech information SO1 and vibration information VO1 outputted accompanying the moving image. Here, in the example illustrated in FIG. 1A, the output timings of moving image, speech information SO1, and vibration information VO1 are synchronized with each other, so the user is able to view the moving image without uncomfortable feeling.

On the other hand, the example illustrated in FIG. 1B illustrates a case where the output timings of the moving image and the speech information SO1 are synchronized with each other but are not synchronized with that of the vibration information VO1. Referring to FIG. 1B, the vibration information VO1 is output after the action of golf shot is completed and the player has left the video. Such output deviation is more likely to give a sense of incompatibility to the user, so it is desirable to provide measures to prevent the output deviation.

Here, in one example, synchronization between moving image, speech, and vibration using a time stamp is conceived as an approach to prevent such output deviation as described above. However, it is necessary for synchronization using time stamps to set a new own vibration file format standard, and the burden such as generation of the time stamps increases. Furthermore, it is necessary to transmit and receive vibration information in addition to moving image information and speech information at the time of communication, which leads to increase in data communication traffic.

The information processing apparatus, the information processing method, and the program according to the present embodiment are conceived focusing on the above points, and it is possible to present synchronized vibration to the user while reducing data communication traffic by embedding vibration information in a general-purpose file format. To this end, the technical idea according to the present embodiment has one feature of cutting out waveform data in a to-be-synthesized band from speech data and synthesizing waveform data extracted from a synthesizing band of vibration data with the to-be-synthesized band. The functions of the information processing apparatus, information processing method, and program according to the present embodiment and the effects achieved from the functions are described below in detail.

1.2. System Configuration Example

A system configuration example according to the present embodiment is now described. FIG. 2 is a diagram illustrating a system configuration example according to the present embodiment. Referring to FIG. 2, an information processing system according to the present embodiment includes a file generation device 10 and a playback device 20. In addition, the file generation device 10 and the playback device 20 are connected via a network 30 so that they can communicate with each other.

File Generation Device 10

The file generation device 10 according to the present embodiment is an information processing apparatus that generates a file including speech waveform data and vibration waveform data. As described above, the file generation device 10 according to the present embodiment has one feature of generating the above-mentioned file by embedding vibration waveform data in a general-purpose speech file format or moving image file format.

The file generation device 10 according to the present embodiment may have a function of generating the above-mentioned file on the basis of the collected moving image information, speech information, and vibration information and transmitting it to the playback device 20. In this case, the file generation device 10 according to the present embodiment may be, in one example, a smartphone, a tablet computer, a mobile phone, a personal computer (PC), a wearable device, or the like. The file generation device 10 is capable of encoding the captured moving image and the vibration information collected together with the moving image to generate a file and transmitting the file to the playback device 20.

Further, the file generation device 10 according to the present embodiment may be a content server that generates, saves, and delivers the content including speech information and vibration information. In this case, the file generation device 10 is capable of generating the file on the basis of the collected moving image information, speech information, and vibration information, and delivering the file in response to a request from the playback device 20. In addition, the file generation device 10 according to the present embodiment may generate the above-mentioned file by embedding vibration waveform data in an existing speech file or moving image file.

Playback Device 20

The playback device 20 according to the present embodiment is an information processing apparatus that outputs sound and vibration on the basis of speech waveform data and vibration waveform data obtained by decoding a file received from the file generation device 10.

In addition, the playback device 20 according to the present embodiment may play back a moving image together with sound and vibration. The playback device 20 according to the present embodiment may be, in one example, a smartphone, a tablet computer, a mobile phone, a PC, a wearable device, or the like.

Network 30

The network 30 has a function of connecting the file generation device 10 and the playback device 20. The network 30 may include the public line network such as the Internet, telephone line networks, and satellite communication networks, the various local area networks (LANs) and wide area networks (WANs) including Ethernet (registered trademark), or the like. In addition, the network 30 may include a leased line network such as Internet protocol-virtual private network (IP-VPN). In addition, the network 30 may include a wireless communication network such as Wi-Fi (registered trademark) and Bluetooth (registered trademark).

1.3. Functional Configuration Example of File Generation Device 10

A functional configuration example of the file generation device 10 according to the present embodiment is now described. Referring to FIG. 2, the file generation device 10 according to the present embodiment includes a collection unit 110, a file generation unit 120, and a communication unit 130.

Collection Unit 110

The collection unit 110 has a function of collecting speech information, moving image information, vibration information, or the like. For this purpose, the collection unit 110 according to the present embodiment is provided with a microphone, an imaging device, a vibration sensor, or the like.

File Generation Unit 120

The file generation unit 120 has a function of generating a file including speech waveform data and vibration waveform data. In this event, the file generation unit 120 according to the present embodiment initially cuts out waveform data in a to-be-synthesized band from the first speech data. Here, the first speech data may be speech data collected by the collection unit 110 or speech data obtained by decoding an existing file. Then, the file generation unit 120 synthesizes waveform data extracted from a synthesizing band of the vibration data with the to-be-synthesized band to generate second speech data. Subsequently, the file generation unit 120 is capable of encoding the generated second speech data to generate a file including the speech waveform data and the vibration waveform data.

In this event, the file generation unit 120 according to the present embodiment may generate the above-mentioned file in a format, in one example, such as a widely used MPEG-1 Audio Layer-3 (MP3) format, MP4 format, or the like. In other words, the file generation unit 120 according to the present embodiment is capable of embedding the vibration waveform data in a predetermined band of the speech data of the existing file format.

The function of the file generation unit 120 according to the present embodiment as described above makes it possible to easily transmit and receive vibration information synchronized with speech and a moving image without preparing its own format. In addition, the use of the existing file format makes it possible to reduce data communication traffic. Moreover, details on the function of the file generation unit 120 according to the present embodiment are described later separately.

Communication Unit 130

The communication unit 130 has a function of performing information communication with the playback device 20. Specifically, the communication unit 130 according to the present embodiment transmits the file generated by the file generation unit 120 to the playback device 20. In addition, in a case where the file generation device 10 according to the present embodiment is a content server or the like, the communication unit 130 receives a file download request or the like from the playback device 20.

The functional configuration example of the file generation device 10 according to the present embodiment is described above. Moreover, the configuration described above with reference to FIG. 2 is merely an example, and the functional configuration of the file generation device 10 according to the present embodiment is not limited to this example. The file generation device 10 may be further provided with other components than those mentioned above. In one example, the file generation device 10 may further have an input unit that accepts an input operation by a user, and an output unit that outputs visual information and auditory information. The functional configuration of the file generation device 10 according to the present embodiment is flexibly modifiable.

1.4. Functional Configuration Example of Playback Device 20

A functional configuration example of the playback device 20 according to the present embodiment is now described. Referring to FIG. 2, the playback device 20 according to the present embodiment includes an output unit 210, a file analysis unit 220, and a communication unit 230.

Output Unit 210

The output unit 210 has a function of outputting speech, moving images, vibration, or the like. The output unit 210 according to the present embodiment may perform output based on speech waveform data and vibration waveform data acquired by the file analysis unit 220 described later. For this purpose, the output unit 210 according to the present embodiment includes various devices that output visual information, auditory information, and tactile information.

The output unit 210 includes, in one example, a cathode ray tube (CRT) display device, a liquid crystal display (LCD) device, an organic light emitting diode (OLED) device, a touch panel, or the like.

Further, the output unit 210 includes, in one example, an audio output amplifier, a loudspeaker, or the like. Moreover, the output unit 210 according to the present embodiment may include a plurality of loudspeakers that support stereo reproduction.

Further, the output unit 210 includes a vibration device such as LRA, piezoelectric actuator, or eccentric motor, and an integrated circuit (IC) that drives the vibration device. Moreover, the output unit 210 according to the present embodiment may be provided with a plurality of vibration devices corresponding to the plurality of loudspeakers.

File Analysis Unit 220

The file analysis unit 220 has a function of acquiring speech waveform data and vibration waveform data from the file generated by the file generation device 10. In this event, the file analysis unit 220 according to the present embodiment has one feature of separating speech data obtained by decoding the file on the basis of the to-be-synthesized band to acquire the speech waveform data and the vibration waveform data. Moreover, details on the function of the file analysis unit 220 according to the present embodiment are described later separately.

Communication Unit 230

The communication unit 230 has a function of performing information communication with the file generation device 10. Specifically, the communication unit 230 according to the present embodiment receives the file including the speech waveform data and the vibration waveform data from the file generation device 10. In addition, in the case where the file generation device 10 is a content server or the like, the communication unit 230 may transmit a content download request to the file generation device 10.

The functional configuration example of the playback device 20 according to the present embodiment is described above. Moreover, the above-described functional configuration described with reference to FIG. 2 is merely an example, and the functional configuration of the playback device 20 according to the present embodiment is not limited to this example. The playback device 20 may be further provided with other components than those listed above. In one example, the playback device 20 may further include an input unit or the like that accepts an input operation by the user. The functional configuration of the playback device 20 according to the present embodiment is flexibly modifiable.

1.5. Details on File Generation and File Analysis

Details on file generation and file analysis according to the present embodiment are now described. As described above, the file generation device 10 according to the present embodiment is capable of generating the second speech data by cutting out waveform data in the to-be-synthesized band from the first speech data and by synthesizing waveform data extracted from the synthesizing band of the vibration waveform data with the to-be-synthesized band.

Generation and Analysis of Monophonic Speech File

The generation and analysis of a monophonic speech file according to the present embodiment are first described. The file generation device 10 according to the present embodiment is capable of generating a file corresponding to monophonic speech, and the playback device 20 according to the present embodiment is capable of acquiring monophonic speech data and vibration data by analyzing the file.

Figure 3:
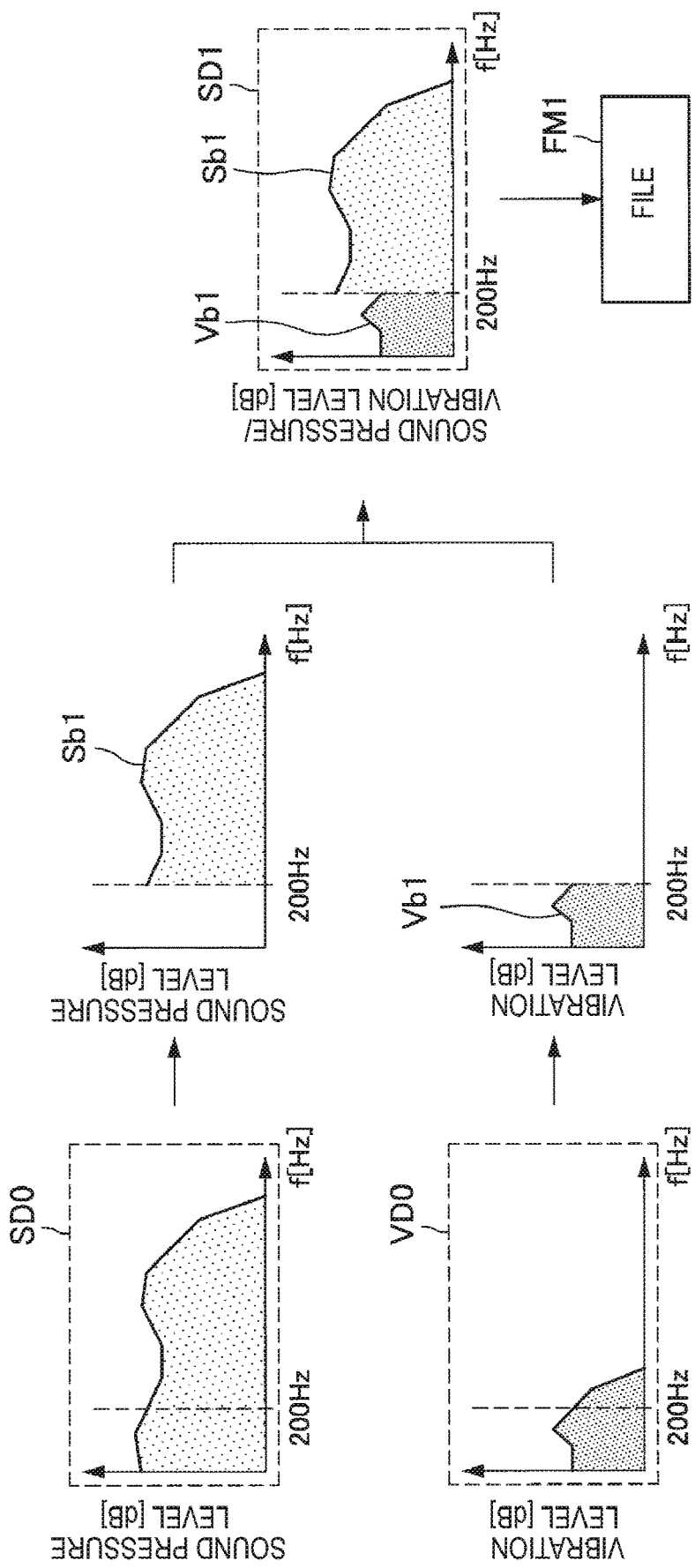
FIG. 3 is a diagram illustrated to describe generation of a monophonic speech file according to the present embodiment.

FIG. 3 is a diagram illustrated to describe generation of a monophonic speech file according to the present embodiment. As illustrated in FIG. 3, the file generation unit 120 of the file generation device 10 initially cuts out waveform data in the to-be-synthesized band from first speech data SD0 and acquires speech waveform data Sb1. In addition, the file generation unit 120 extracts vibration waveform data Vb1 in the synthesizing band from vibration data VD0. Moreover, the first speech data SD0 may be speech data collected by the collection unit 110 or may be speech data acquired by decoding the existing file.

Here, the to-be-synthesized band and the synthesizing band according to the present embodiment may be a bass frequency band of 0 Hz to a predetermined frequency or less. In one example, as illustrated in FIG. 3, the file generation unit 120 may cut out the band of 0 Hz to 200 Hz from the first speech data SD0 and may extract the vibration waveform data Vb1 of 0 Hz to 200 Hz from the waveform data VD0. In other words, the file generation unit 120 according to the present embodiment is capable of cutting out speech waveform data of a bass frequency band that is generally difficult to perceive it from the first speech data SD0, and is capable of extracting vibration waveform data of a band that is easy to perceive it as vibration from the vibration data VD0.

Then, the file generation unit 120 according to the present embodiment synthesizes the synthesizing band extracted from the vibration data with the first speech data obtained by cutting off the to-be-synthesized band to generate second speech data SD1. In other words, the file generation unit 120 synthesizes waveform data Sb1 in the band of 200 Hz or more that is extracted from the first speech data SD0 and the synthesizing band of 0 Hz to 200 Hz that is extracted from the vibration data VD0 to generate the second speech data SD1.

Further, the file generation unit 120 encodes the generated second speech data SD1 to generate a file FM1. In this event, the file generation unit 120 according to the present embodiment is capable of generating the file FM1 using a general-purpose format such as MP3 or MP4.

Figure 4:
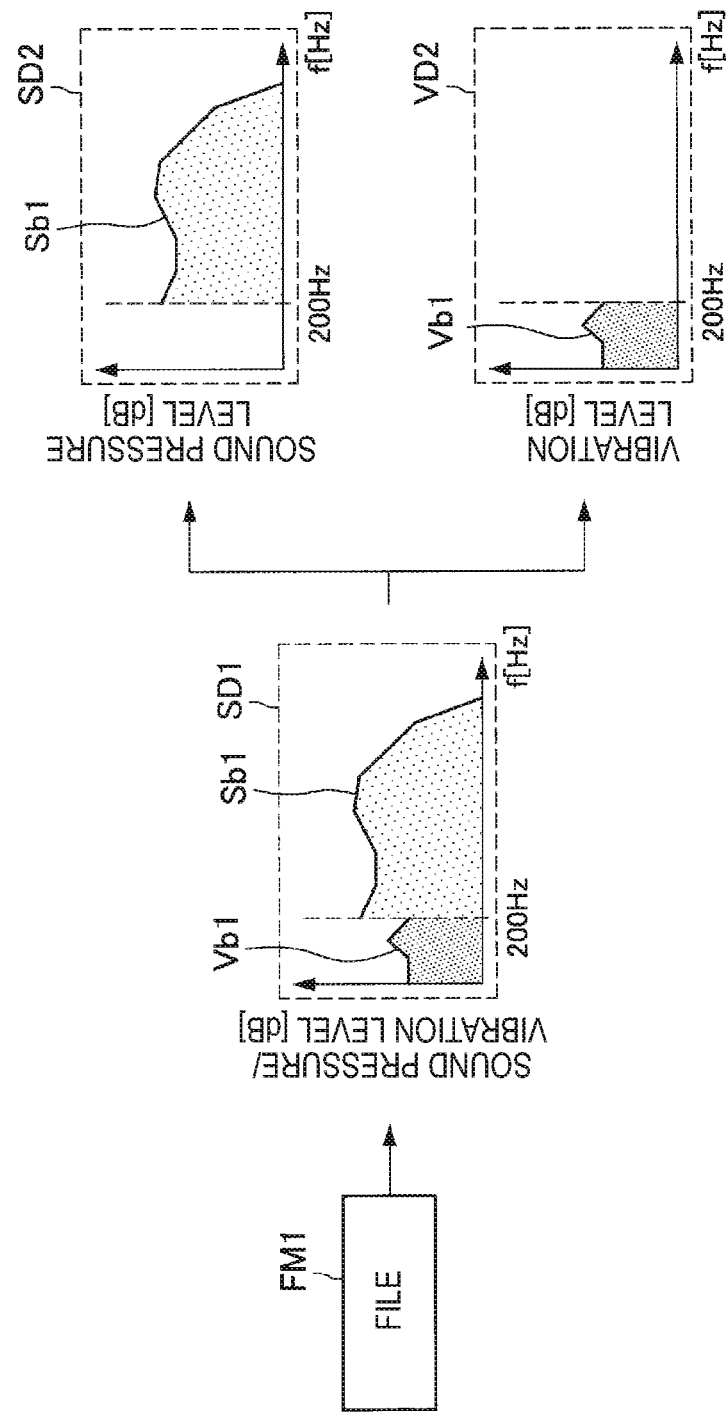
FIG. 4 is a diagram illustrating analysis of a monophonic speech file according to the present embodiment.

The analysis of the monophonic speech file by the playback device 20 is now described. FIG. 4 is a diagram illustrated to describe analysis of a monophonic speech file by the playback device 20 according to the present embodiment. As illustrated in FIG. 4, the communication unit 230 of the playback device 20 initially receives the file FM1 generated by the file generation device 10. In this event, the communication unit 230 may receive the file FM1 actively transmitted by, in one example, a user's operation from the file generation device 10, or may receive the file FM1 by making a download request to the file generation device 10.

Then, the file analysis unit 220 according to the present embodiment decodes the received file FM1 to acquire the speech data SD1. Furthermore, the file analysis unit 220 separates the speech data SD1 on the basis of the to-be-synthesized band and acquires speech data SD2 for playback and vibration data VD2 for playback. In other words, the file analysis unit 220 according to the present embodiment is capable of acquiring the speech data SD2 for playback and the vibration data VD2 for playback by separating the speech data SD1 extracted from the file FM1 into the band of 0 Hz to 200 Hz and the band of 200 Hz or more.

In this event, as illustrated in FIG. 4, the speech data SD2 for playback includes the speech waveform data Sb1 of 200 Hz or more, and the vibration data VD2 for playback includes vibration waveform data Vb1 of 0 Hz to 200 Hz. The speech data SD2 for playback and the vibration data VD2 for playback, which are acquired by the file analysis unit 220, are transferred to the output unit 210 and are output as auditory information and tactile information, respectively.

Generation and Analysis of Stereophonic Speech File

The generation and analysis of a stereophonic speech file according to the present embodiment are now described. The file generation device 10 according to the present embodiment is capable of generating a file corresponding to stereophonic speech, and the playback device 20 according to the present embodiment is capable of acquiring stereophonic speech data and vibration data by analyzing the file.

In this event, the file generation unit 120 according to the present embodiment may generate third speech data by adding waveform data in the to-be-synthesized band being cut out from two pieces of the first speech data and synthesizing the added waveform data with the to-be-synthesized band in one of two pieces of the first speech data. In addition, the file generation unit 120 may generate the second speech data by synthesizing the waveform data in the synthesizing band that is extracted from the vibration data with the to-be-synthesized band in the other one of two pieces of the first speech data. The file generation unit 120 is capable of encoding the second speech data and the third speech data to generate a stereophonic speech file.

Figure 5:
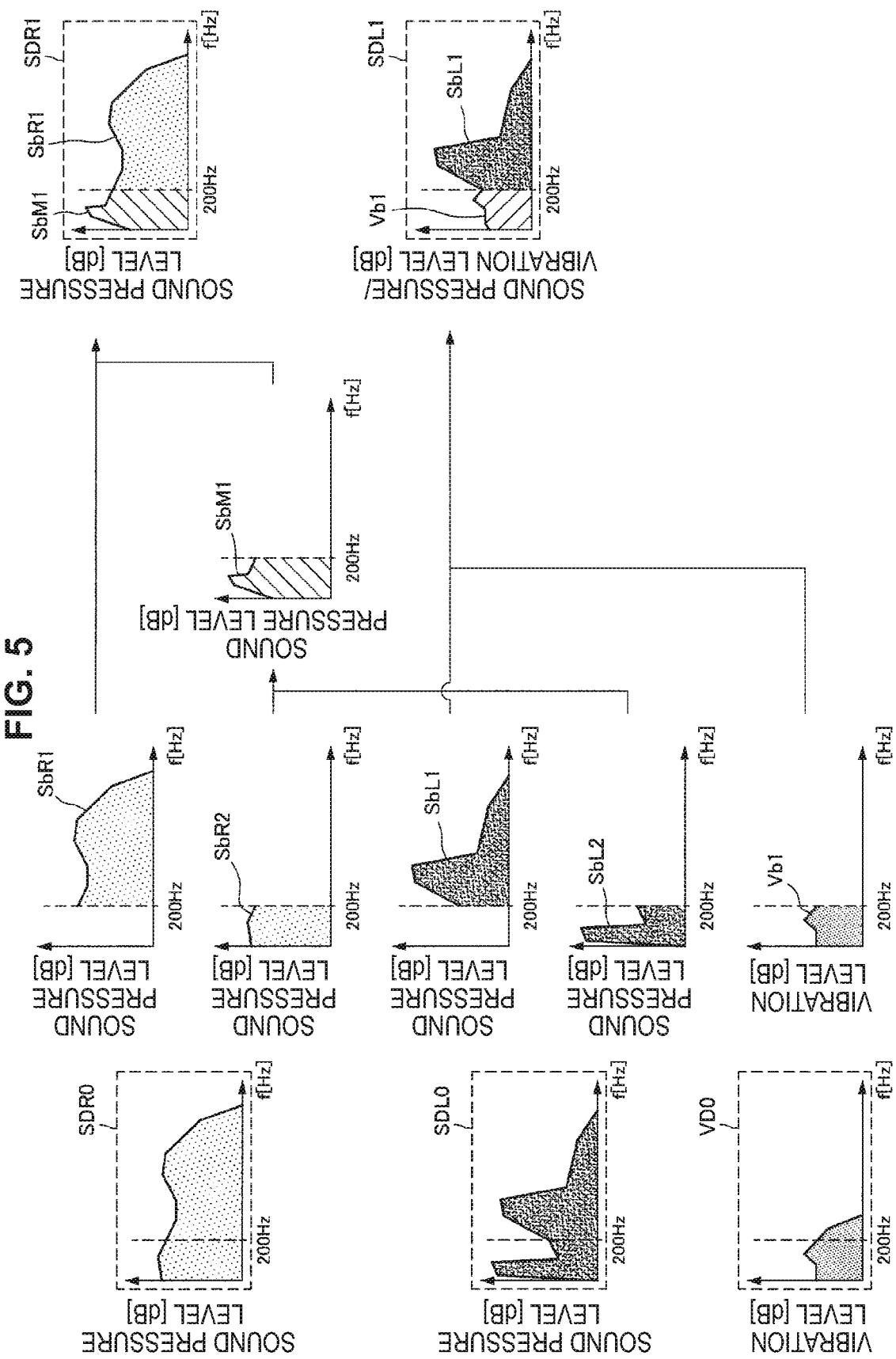
FIG. 5 is a diagram illustrated to describe generation of a stereophonic speech file according to the present embodiment.

FIG. 5 is a diagram illustrated to describe generation of a stereophonic speech file according to the present embodiment. The file generation unit 120 initially separates two first speech data SDL0 and SDR0 on the basis of the to-be-synthesized band. Here, the first speech data SDL0 and SDR0 may be speech data corresponding to the left and right loudspeakers, respectively.

Further, the file generation unit 120 extracts the vibration waveform data Vb1 in the synthesizing band from the vibration data VD0. Here, the to-be-synthesized band and the synthesizing band each may be the band of 0 Hz to 200 Hz.

Then, the file generation unit 120 adds speech waveform data SbL2 and SbR2 in the to-be-synthesized band that are respectively extracted from the first speech data SDL0 and SDR0 to obtain added speech waveform data SbM1. In this event, the file generation unit 120 synthesizes the added speech waveform data SbM1 with speech waveform data SbR1 in the band of 200 Hz or more that is extracted from the first speech data SDR0 to generate third speech waveform data SDR1.

On the other hand, the file generation unit 120 synthesizes speech waveform data SbL1 in the band of 200 Hz or more that is extracted from the first speech data SDL0 and the vibration waveform data Vb1 in the band of 0 Hz to 200 Hz that is extracted from the vibration data VD0, and so synthesizes speech waveform data SDL1.

In other words, the file generation unit 120 according to the present embodiment is capable of generating two pieces of speech data on the basis of two pieces of the first speech data and one piece of the vibration data. In this event, one of the generated two pieces of speech data includes the vibration waveform data extracted from the waveform data, and the other speech data includes added waveform data in the bass frequency band that is extracted from the two pieces of first speech data. The function of the file generation unit 120 according to the present embodiment as described above makes it possible to add information of the speech waveform data in the bass frequency band and includes it to one of the speech data, thereby preventing reduction in sound quality.

Further, the file generation unit 120 encodes the generated third speech data SDR1 and second speech data SDL1 to generate the file FM1, and transmits the generated file FM1 to the playback device 20.

Figure 6:
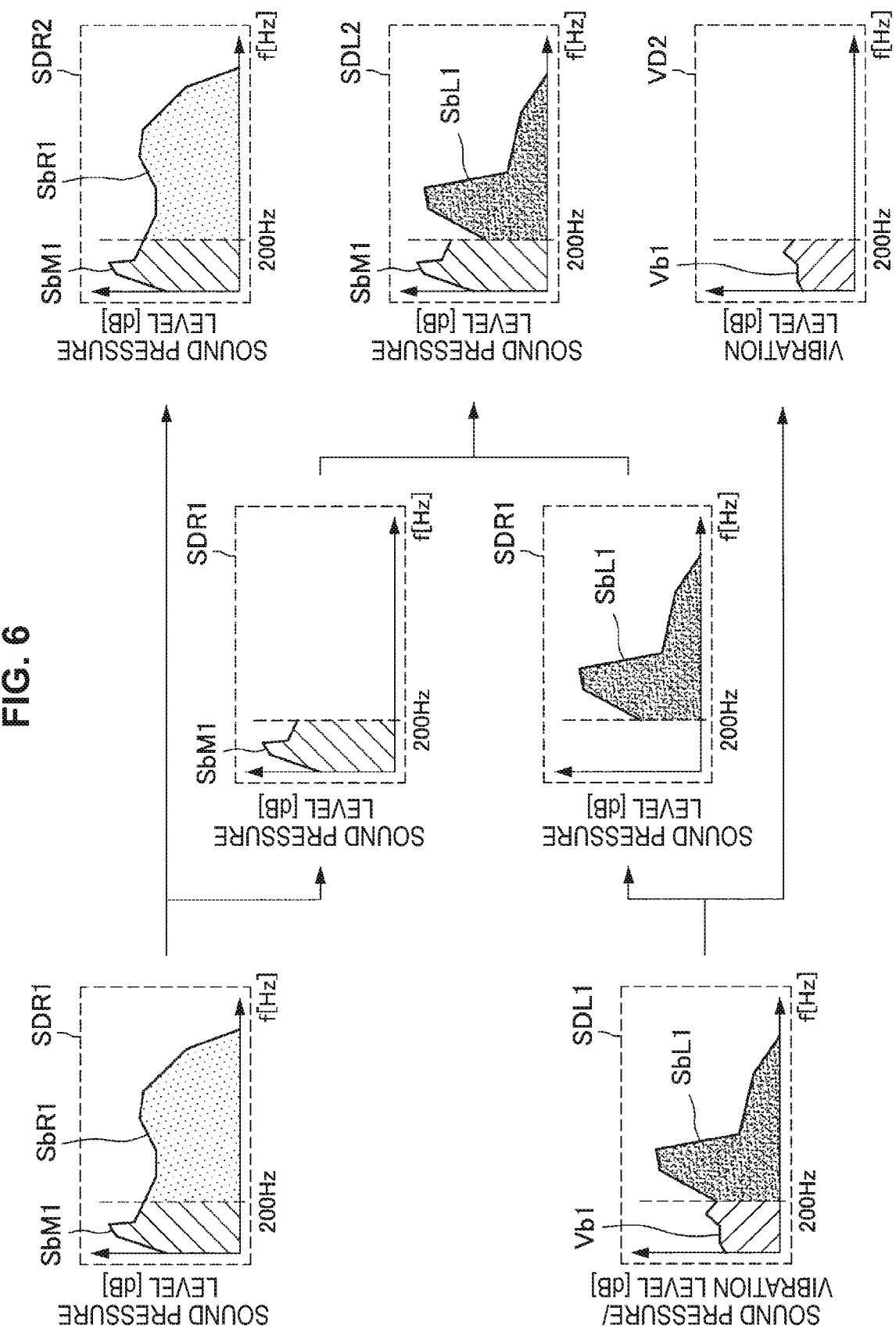
FIG. 6 is a diagram illustrated to describe analysis of a stereophonic speech file according to the present embodiment.

The analysis of a stereophonic speech file by the playback device 20 is now described. FIG. 6 is a diagram illustrated to describe analysis of a stereophonic speech file by the playback device 20 according to the present embodiment. The file analysis unit 220 according to the present embodiment initially decodes the file FM1 received by the communication unit 230 to acquire the speech data SDR1 and SDL1.

Then, the file analysis unit 220 according to the present embodiment acquires two pieces of speech data SDR2 and SDR1 for play back and one piece of vibration data VD2 for playback on the basis of the acquired two pieces of speech data SDR1 and SDL1. In this event, the file analysis unit 220 extracts a to-be-synthesized band of one of the two pieces of speech data obtained by decoding the file to acquire vibration waveform data. In addition, the file analysis unit 220 acquires speech waveform data obtained by synthesizing waveform data of the to-be-synthesized band duplicated from the other speech data with the to-be-synthesized band of the one.

In other words, the file analysis unit 220 according to the present embodiment separates the speech data SDL1 obtained by decoding the file FM1 on the basis of the to-be-synthesized band to acquire the vibration data VD2 for playback including the vibration waveform data Vb1. In addition, the file analysis unit 220 synthesizes the added speech waveform data SbM1 in the to-be-synthesized band of the speech data SDR1 obtained by decoding the file FM1 with the speech waveform data SbL1 in the band of 200 Hz or more of the speech data SDRL1 to acquire speech data SDL2 for left playback. In addition, the file analysis unit 220 divertingly uses the speech data SDR1 obtained by decoding the file FM1 as the speech data SDR2 for right playback.

The function of the file analysis unit 220 according to the present embodiment as described above makes it possible to acquire speech data for left and right playback with sound quality secured and vibration data from the two pieces of speech data extracted by decoding the file FM1.

Generation and Analysis of Stereophonic Speech Multi-Vibration File

The generation and analysis of a stereophonic speech multi-vibration file according to the present embodiment are now described. The file generation device 10 according to the present embodiment generates a file corresponding to stereophonic speech and multi-vibration, and the playback device 20 according to the present embodiment is capable of analyzing the file to generate stereophonic speech data and a plurality of pieces of vibration data corresponding to the stereophonic speech data.

Figure 7:
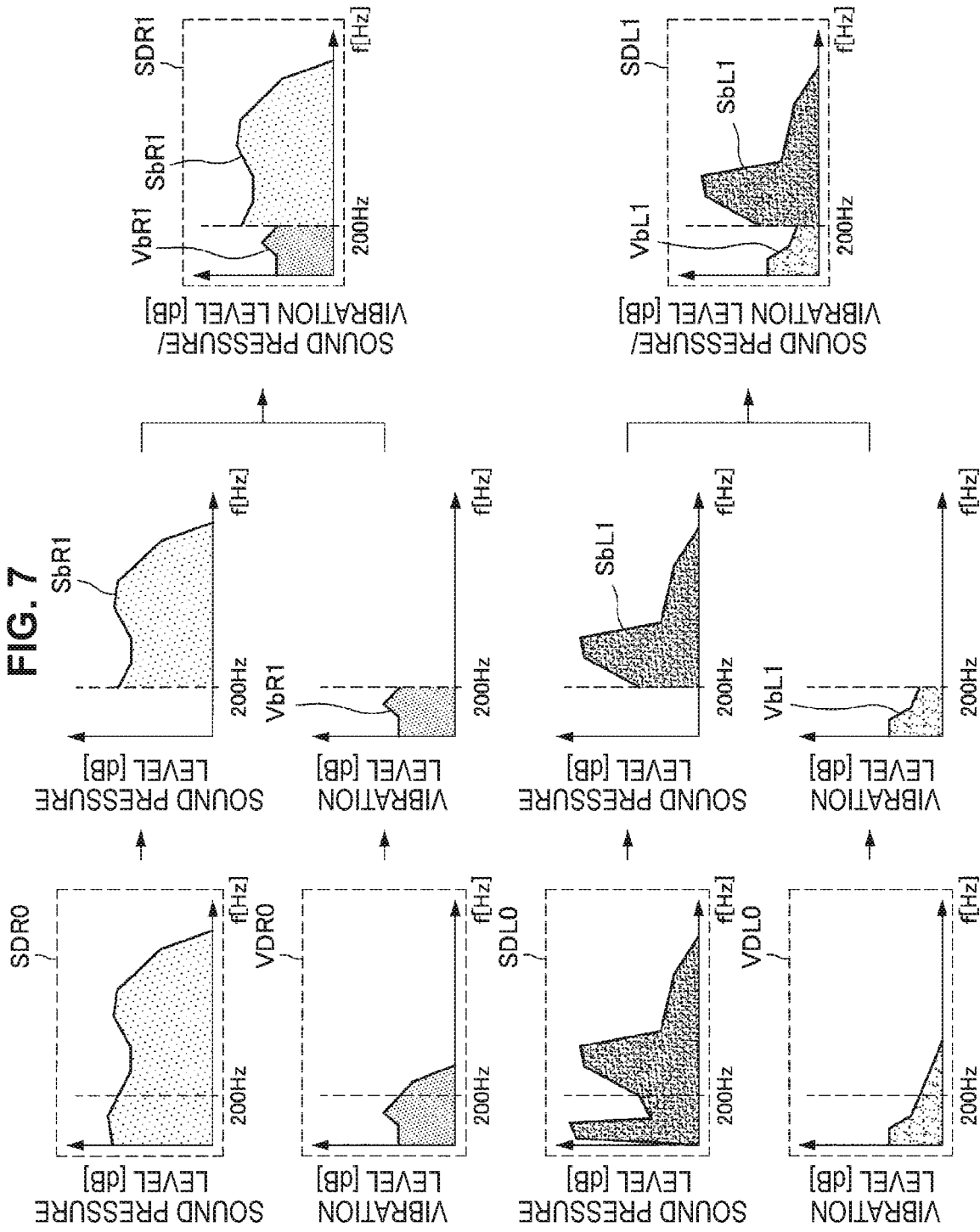
FIG. 7 is a diagram illustrated to describe generation of a stereophonic speech multi-vibration file according to the present embodiment.

FIG. 7 is a diagram illustrated to describe generation of the stereophonic speech multi-vibration file according to the present embodiment. The file generation unit 120 initially extracts the speech waveform data SbL1 and SbR1 in the band of 200 Hz or more respectively from the two first speech data SDL0 and SDR0. In addition, the file generation unit 120 extracts the vibration waveform data VbL1 and VbR1 in the band of 0 Hz to 200 Hz respectively from the two vibration waveform data VDL0 and VDR0.

Subsequently, the file generation unit 120 synthesizes the extracted speech waveform data SbR1 with vibration waveform data VbR1 to generate the second speech data SDR1. Similarly, the file generation unit 120 synthesizes the speech waveform data SbL1 with the vibration waveform data VbL1 to generate the second speech data SDL1. In addition, the file generation unit 120 encodes the two generated second speech data SDL1 and SDR1 to generate the file FM1. As described above, the file generation unit 120 according to the present embodiment makes it possible to generate the file corresponding to stereophonic speech and multi-vibration.

The analysis of the stereophonic speech multi-vibration file by the playback device 20 is now described. The file analysis unit 220 according to the present embodiment is capable of extracting two sets of speech waveform data and vibration waveform data from two pieces of speech data obtained by decoding the file received by the communication unit 230.

Figure 8:
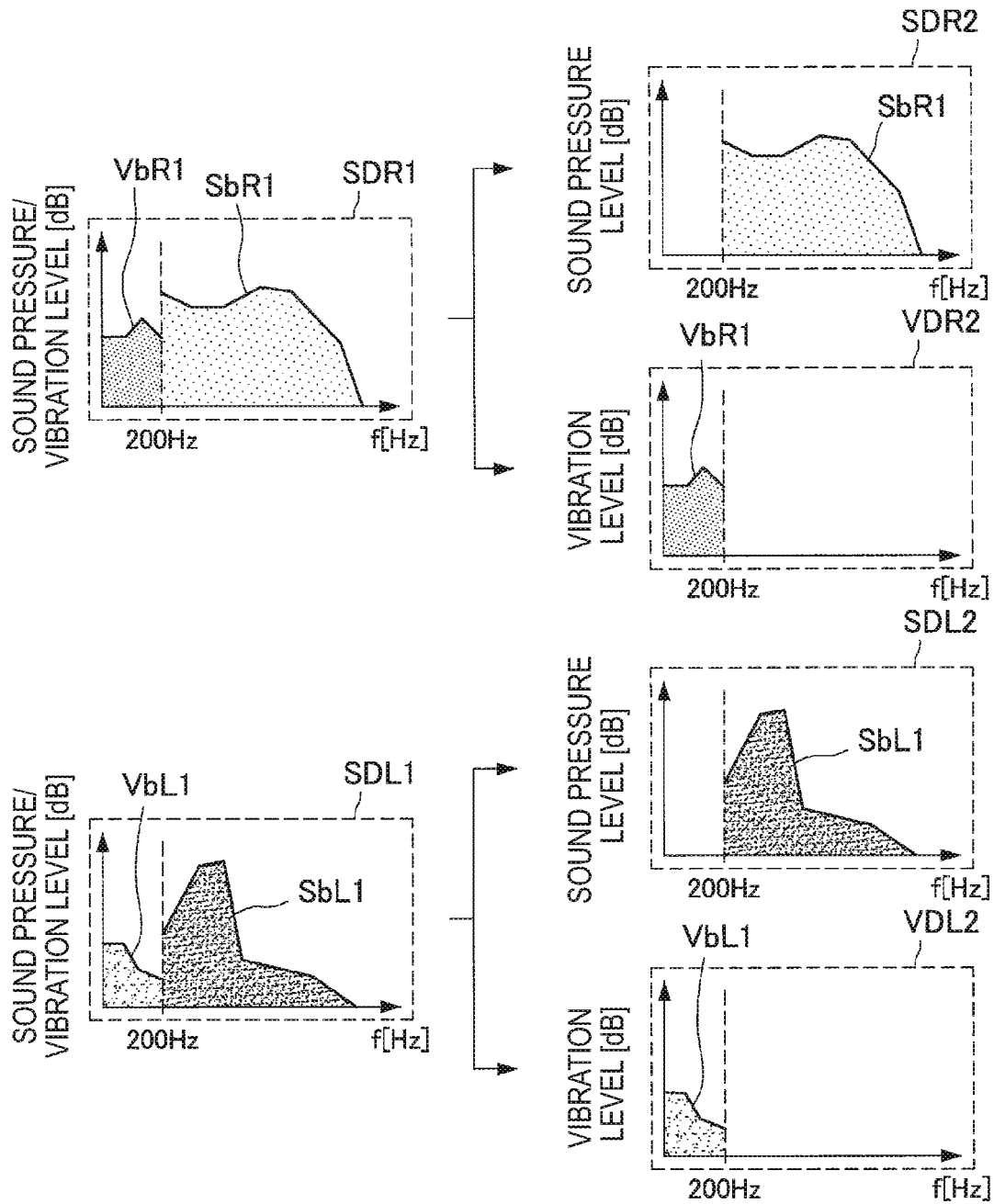
FIG. 8 is a diagram illustrated to describe analysis of a stereophonic speech file according to the present embodiment.

FIG. 8 is a diagram illustrated to describe analysis of the stereophonic speech file by the playback device 20 according to the present embodiment. The file analysis unit 220 according to the present embodiment initially decodes the file FM1 received by the communication unit 230 to acquire the speech data SDR1 and SDL1.

Then, the file analysis unit 220 according to the present embodiment separates the acquired two pieces of speech data SDR1 and SDL1 on the basis of the to-be-synthesized band. In other words, the file analysis unit 220 according to the present embodiment separates the speech data SDR1 on the basis of the to-be-synthesized band, so the file analysis unit 220 is capable of acquiring the speech data SDR2 for right playback including the speech waveform data SbR1 in the band of 200 Hz or more and the vibration data VDR2 for right playback including the vibration waveform data VbR1 in the band of 0 Hz to 200 Hz. Similarly, the file analysis unit 220 separates the speech data SDL1 on the basis of the to-be-synthesized band, so acquires the speech data SDL2 for left playback including the speech waveform data SbL1 in the band of 200 Hz or more and the vibration data VDL2 for left playback including the vibration waveform data VbL1 in the band of 0 Hz to 200 Hz.

The function of the file analysis unit 220 according to the present embodiment as described above makes it possible to acquire two pieces of vibration data corresponding to the left and right vibration devices from the two pieces of speech data extracted by decoding the file FM1.

1.6. Modification of to-be-Synthesized Band

The functions of the file generation device 10 and the playback device 20 according to the present embodiment are described above. Moreover, the above description is given of the case where the to-be-synthesized band according to the present embodiment is a band of 0 Hz to 200 Hz as an example, but the to-be-synthesized band according to the present embodiment is not limited to this example. The to-be-synthesized band according to the present embodiment may be other bands than 0 Hz to 200 Hz.

Any Band of Predetermined Frequency or Less

Figure 9:
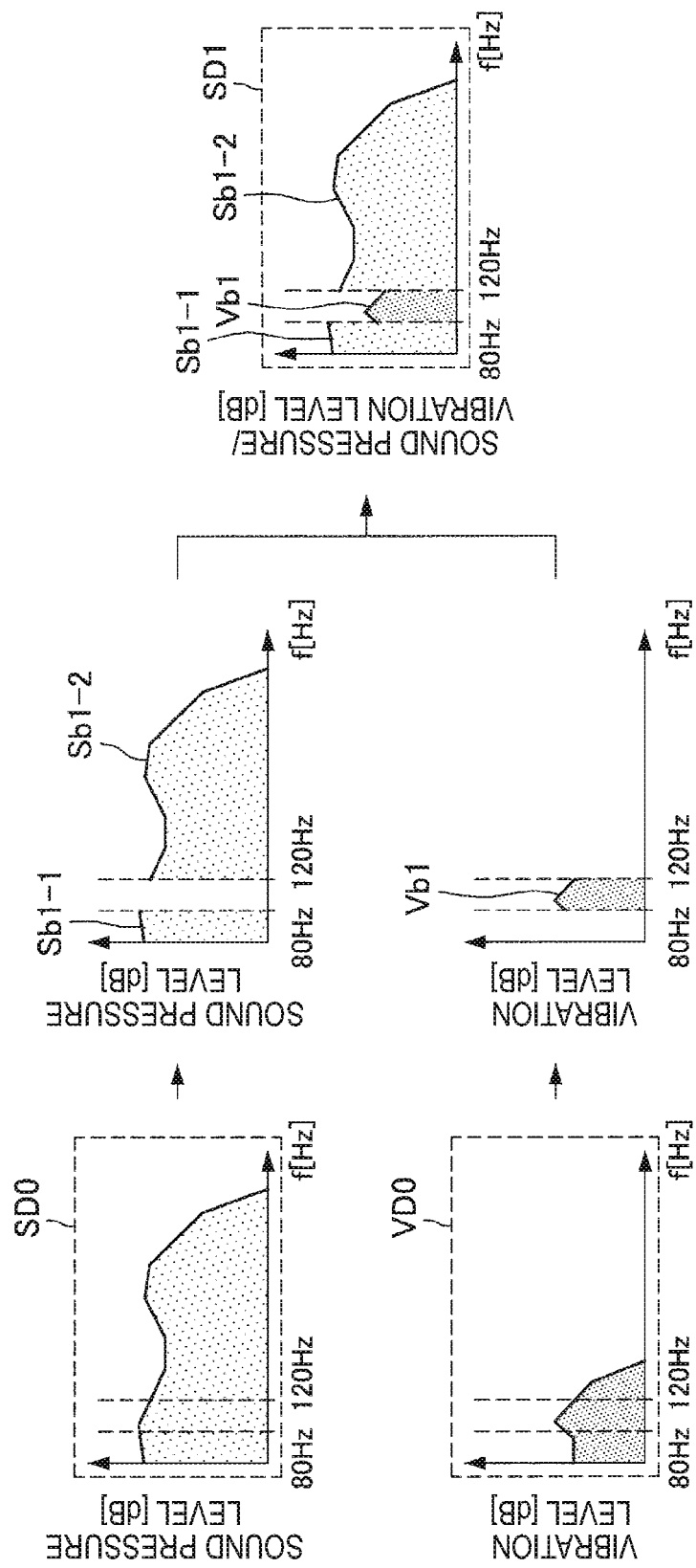
FIG. 9 is a diagram illustrated to describe a case where a to-be-synthesized band and a synthesizing band are any band equal to or less than a predetermined frequency according to the present embodiment.

In one example, the to-be-synthesized band and the synthesizing band according to the present embodiment may be any band of a predetermined frequency or less. FIG. 9 is a diagram illustrated to describe a case where the to-be-synthesized band and the synthesizing band according to the present embodiment are any band equal to or less than a predetermined frequency.

As illustrated in FIG. 9, the to-be-synthesized band and the synthesizing band according to the present embodiment may be, in one example, a band of 80 Hz to 120 Hz. In this case, the file generation unit 120 of the file generation device 10 is capable of extracting speech waveform data Sb1-1 in the band of 0 Hz to 80 Hz and speech waveform data Sb1-2 in the band of 120 Hz or more from the first speech data SD0. In addition, the file generation unit 120 may extract the vibration waveform data Vb1 in the band of 80 Hz to 120 Hz from the vibration data VD0. The file generation unit 120 is capable of synthesizing the extracted speech waveform data Sb1-1 and Sb1-2 and the vibration waveform data Vb1 to generate the second speech data SD1.

The function of the file generation unit 120 according to the present embodiment as described above makes it possible to include the vibration waveform data in the band of 80 Hz to 120 Hz, which is easy to perceive it as vibration, in the second speech data and, at the same time, reduce the amount of speech waveform data to be cut, thereby keeping sound quality high.

Ultra-High Frequency Band Equal to or Higher than Predetermined Frequency

Further, in one example, the to-be-synthesized band according to the present embodiment may be an ultra-high frequency band equal to or higher than a predetermined frequency. Here, the ultra-high frequency band according to the present embodiment may be, in one example, a human inaudible range. More specifically, in a case where the file format corresponds to a high-resolution digital speech signal or the like, the to-be-synthesized band according to the present embodiment may be a band of 20 kHz or more.

Figure 10:
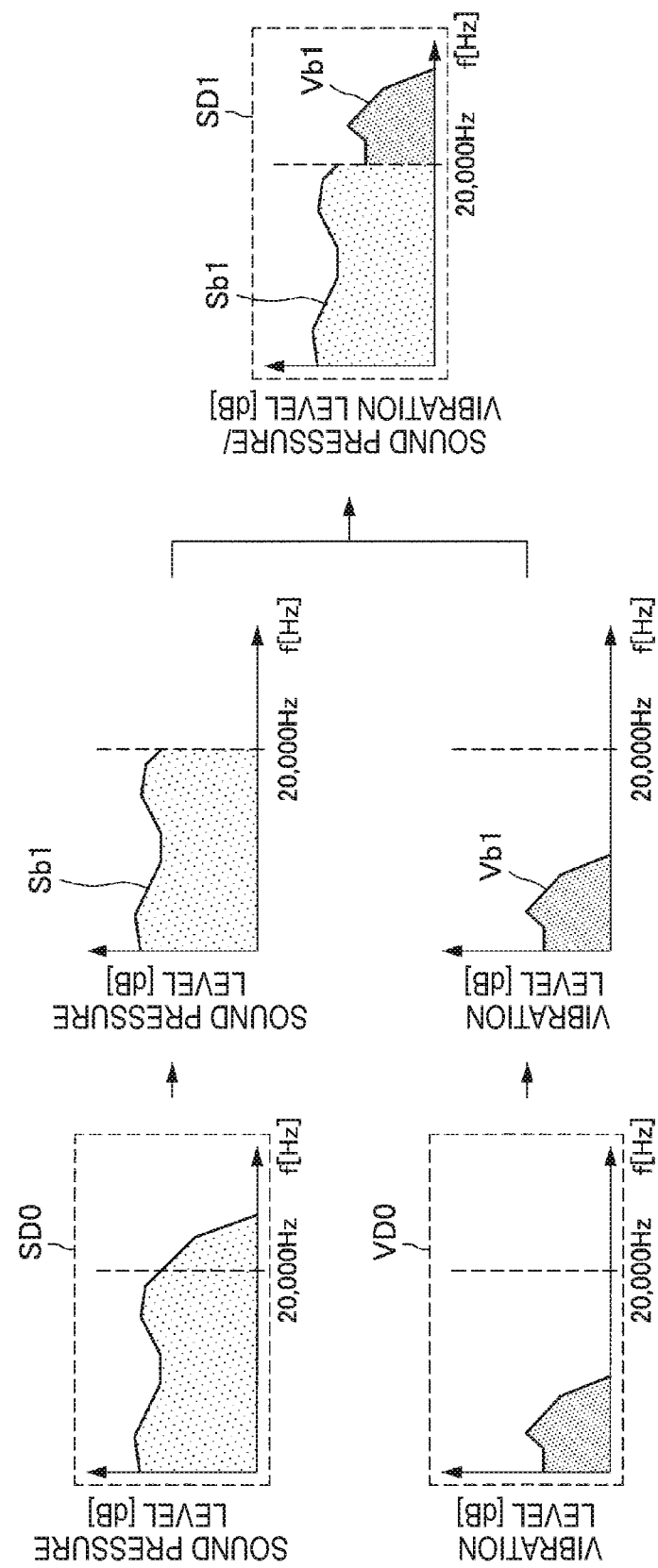
FIG. 10 is a diagram illustrated to describe a case where a to-be-synthesized band is an ultra-high frequency band equal to or more than a predetermined frequency according to the present embodiment.

FIG. 10 is a diagram illustrated to describe a case where the to-be-synthesized band according to the present embodiment is an ultra-high frequency band equal to or higher than a predetermined frequency. FIG. 10 illustrates an example where the to-be-synthesized band is 20 kHz or more. In this case, the file generation unit 120 according to the present embodiment cuts out the speech waveform data in the band of 20 KHz or more from the first speech data SD0 to acquire the speech waveform data Sb1 in the band of 0 Hz to 20 kHz. In addition, the file generation unit 120 acquires the vibration waveform data Vb1 in any band from the vibration data VD0. In this event, the file generation unit 120 may acquire, in one example, vibration waveform data in the band of 200 Hz or less, or may acquire vibration waveform data in the band of 80 Hz to 120 Hz. Subsequently, the file generation unit 120 is capable of synthesizing the acquired speech waveform data Sb1 with vibration waveform data Vb1 to generate the second speech data SD1.

The function of the file generation unit 120 according to the present embodiment as described above makes it possible to include the vibration waveform data in any band, which is sufficient to perceive it as vibration, in the second speech data and, at the same time, completely save the speech waveform data corresponding to the human audible range, thereby generating a file with high sound quality.

Moreover, in the example of FIG. 10, the case where the to-be-synthesized band is the band of 20 kHz or more is described as an example, but the ultra-high frequency band according to the present embodiment is not limited to this example. The to-be-synthesized band according to the present embodiment may be, in one example, a band of 15 kHz or more, or 18 kHz or more. The human inaudible range varies among individuals, but in general, it is known that the frequency band of 15 kHz or more becomes difficult to hear with age. Thus, the file generation unit 120 according to the present embodiment is capable of generating a file in which the sound quality relating to the audible range of more users is secured by including the vibration waveform data in the bands as described above.

Further, in the case where the to-be-synthesized band according to the present embodiment is the ultra-high frequency band, the file generation unit 120 is capable of synthesizing the waveform data in a plurality of synthesizing bands extracted from the vibration data with the to-be-synthesized band. In this event, in one example, the file generation unit 120 may generate a file including a plurality of pieces of vibration waveform data depending on the performance or characteristics of the playback device 20. The playback device 20 according to the present embodiment is capable of extracting vibration waveform data corresponding to its own performance or characteristics from the above-mentioned file and performing vibration output based on the extracted vibration waveform data.

Figure 11:
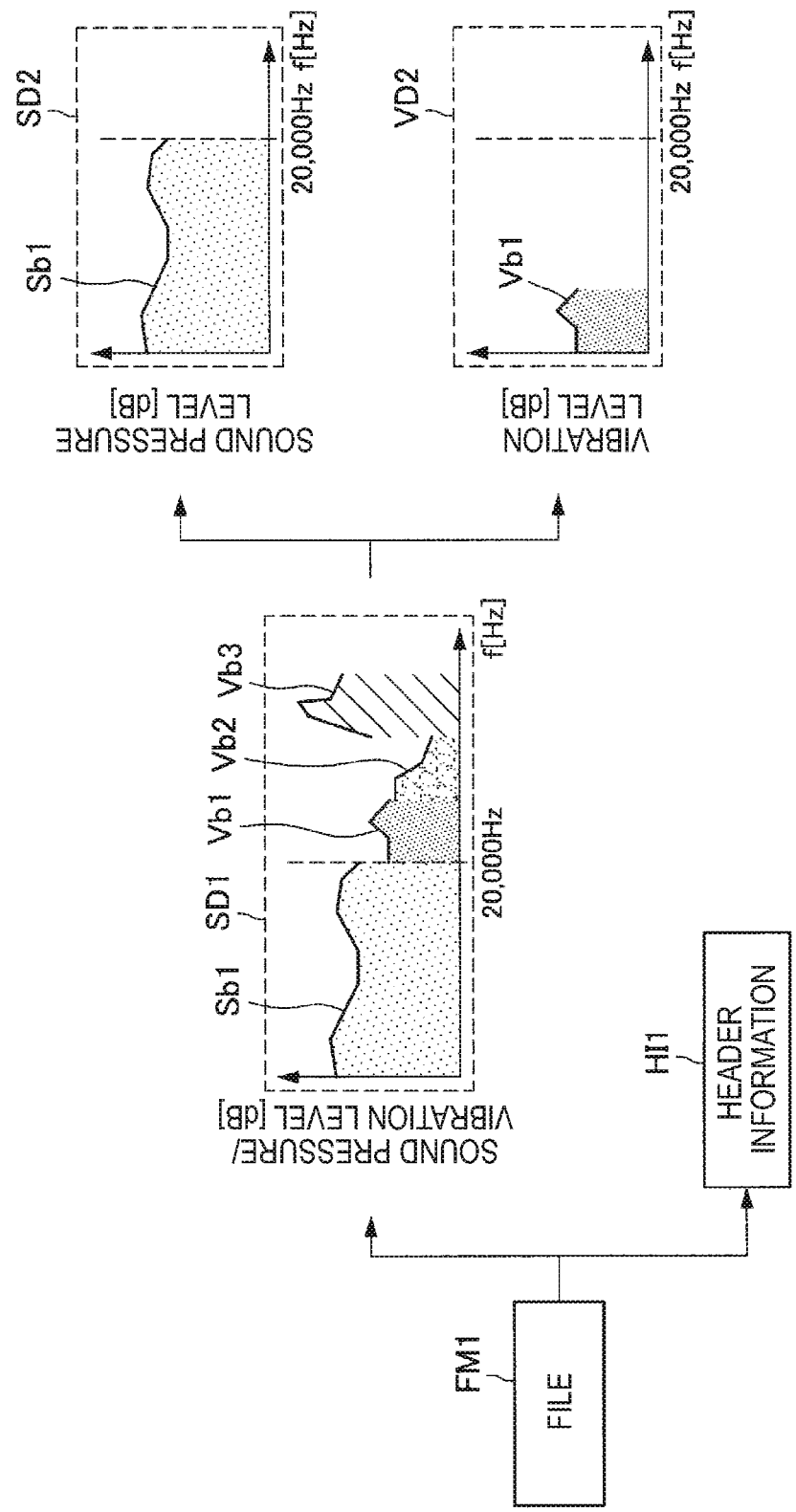
FIG. 11 is a diagram illustrated to describe a file including a plurality of vibration waveform data and extraction of vibration waveform data from the file according to the present embodiment.

FIG. 11 is a diagram illustrated to describe a file including a plurality of pieces of vibration waveform data and extraction of vibration waveform data from the file according to the present embodiment. The file analysis unit 220 according to the present embodiment initially decodes the file FM1 received by the communication unit 230 to acquire the speech data SD1.

Further, in this event, the file analysis unit 220 acquires header information HI1 attached to the file FM1. Here, the header information HI1 may include information used to specify the to-be-synthesized band. In one example, the header information HI1 may include information indicating a frequency of the to-be-synthesized band corresponding to each performance or model type.

In other words, the file analysis unit 220 according to the present embodiment is capable of specifying the to-be-synthesized band on the basis of the header information HI1 attached to the file FM1 or its own device information. Moreover, in the case of the example illustrated in FIG. 11, the file analysis unit 220 acquires the speech data SD2 for playback including the speech waveform data Sb1 and the vibration data VD2 for playback including the vibration waveform data Vb1, from the speech data SD1, on the basis of the header information HI1.

The functions of the file generation device 10 and the playback device 20 according to the present embodiment as described above make it possible to transmit and receive a file including a plurality of pieces of vibration waveform data depending on performance or characteristics of the playback device 20 and to output appropriate vibration corresponding to performance or characteristics of the playback device 20.

Moreover, the above description is given of the case where a plurality of pieces of vibration waveform data is included in the file to be transmitted or received, but the file generation device 10 according to the present embodiment may generate a file including vibration waveform data suitable for the performance or characteristics of the playback device 20 in advance on the basis of on the device information of the transmission destination playback device 20. In addition, the playback device 20 according to the present embodiment is also capable of processing the vibration waveform data depending on the performance or characteristics after extracting the common vibration waveform data included in the file.

1.7. Operations of File Generation Device 10 and Playback Device 20

The operations of the file generation device 10 and the playback device 20 according to the present embodiment are now described in detail.

Figure 12:
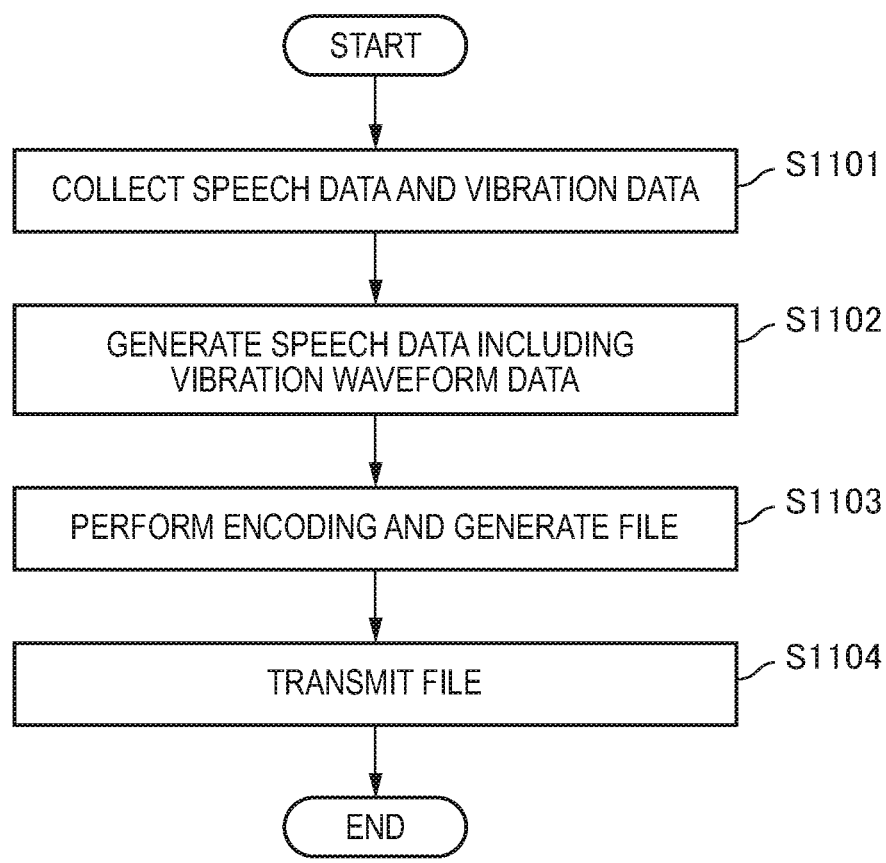
FIG. 12 is a flowchart illustrating an operation of a file generation device that transmits a file generated on the basis of collected information according to the present embodiment.

Operation of File Generation Device 10 that Transmits File Generated on Basis of Collected Information The operation of the file generation device 10 that transmits the file generated on the basis of collected information is now described. As described above, the file generation device 10 according to the present embodiment may generate a file on the basis of the speech information and vibration information collected by the collection unit 110, and may transmit the file to the playback device 20. In this case, the file generation device 10 according to the present embodiment may be, in one example, a smartphone, a tablet computer, a mobile phone, a PC, a wearable device, or the like. FIG. 12 is a flowchart illustrating the operation of the file generation device 10 that transmits the file generated on the basis of the collected information.

Referring to FIG. 12, the collection unit 110 of the file generation device 10 initially collects speech data and vibration data (S1101). In addition, in this event, the collection unit 110 may collect moving image data at the same time.

Then, the file generation unit 120 according to the present embodiment generates the second speech data including the speech waveform data and the vibration waveform data (S1102).

Then, the file generation unit 120 according to the present embodiment encodes the second speech data generated in step S1102 to generate a file including speech waveform data and vibration waveform data (S1103).

Then, the communication unit 130 according to the present embodiment transmits the file generated in step S1103 to the playback device 20 (S1104).

Figure 13:
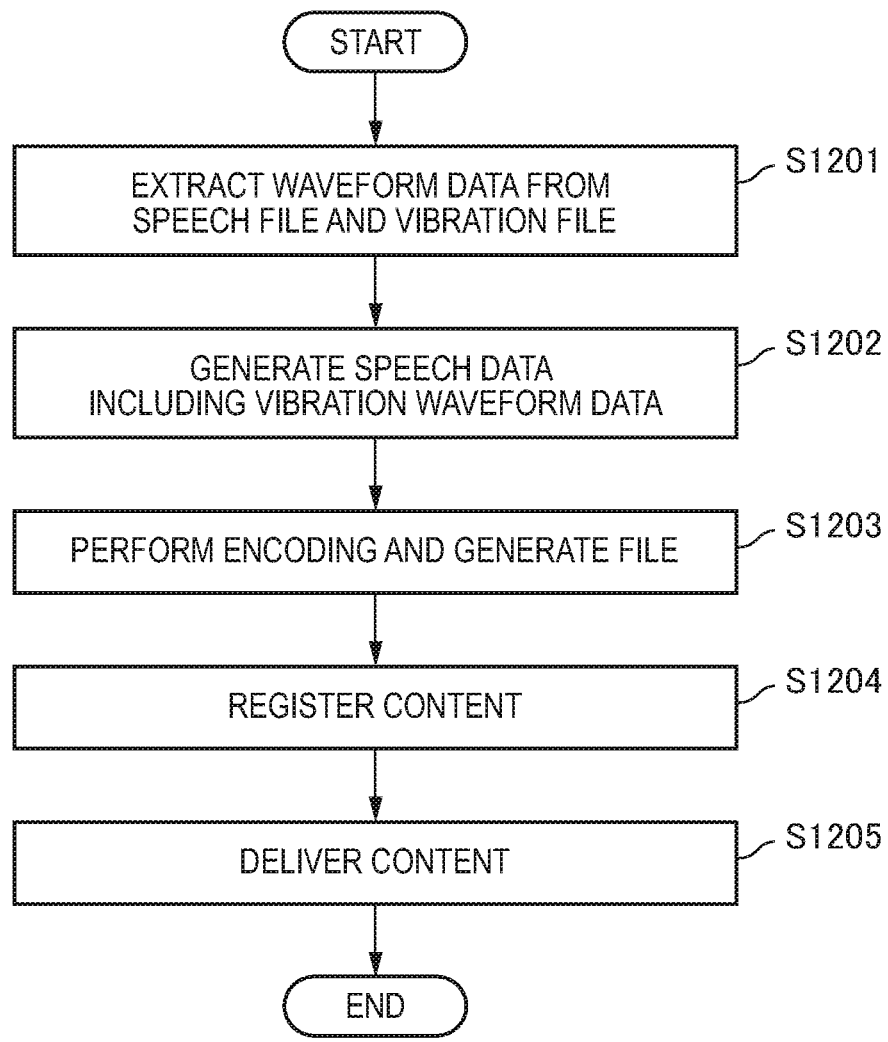
FIG. 13 is a flowchart illustrating an operation of a file generation device that delivers content including vibration waveform data according to the present embodiment.

Operation of File Generation Device 10 that Delivers Content Including Vibration Waveform Data The operation of the file generation device 10 that delivers content including vibration waveform data is now described. As described above, the file generation device 10 according to the present embodiment may generate a new file by embedding the vibration waveform data in the speech data extracted from the existing file, and the file generation device 10 may be a content server that delivers the file as content. FIG. 13 is a flowchart illustrating the operation of the file generation device 10 that delivers content including vibration waveform data.

Referring to FIG. 13, initially, the file generation unit 120 according to the present embodiment extracts speech waveform data and vibration waveform data respectively from a speech file and a vibration file (S1201).

Then, the file generation unit 120 according to the present embodiment generates the second speech data including the speech waveform data and the vibration waveform data (S1202).

Then, the file generation unit 120 according to the present embodiment encodes the second speech data generated in step S1202 to generate a file including the speech waveform data and the vibration waveform data (S1203).

Subsequently, the file generation unit 120 according to the present embodiment registers the file generated in step S1203 as content (S1204).

Then, the communication unit 230 according to the present embodiment transmits the content registered in step S1204 to the playback device 20 on the basis of a download request from the playback device 20 (S1205).

Operation of Playback Device 20

Figure 14:
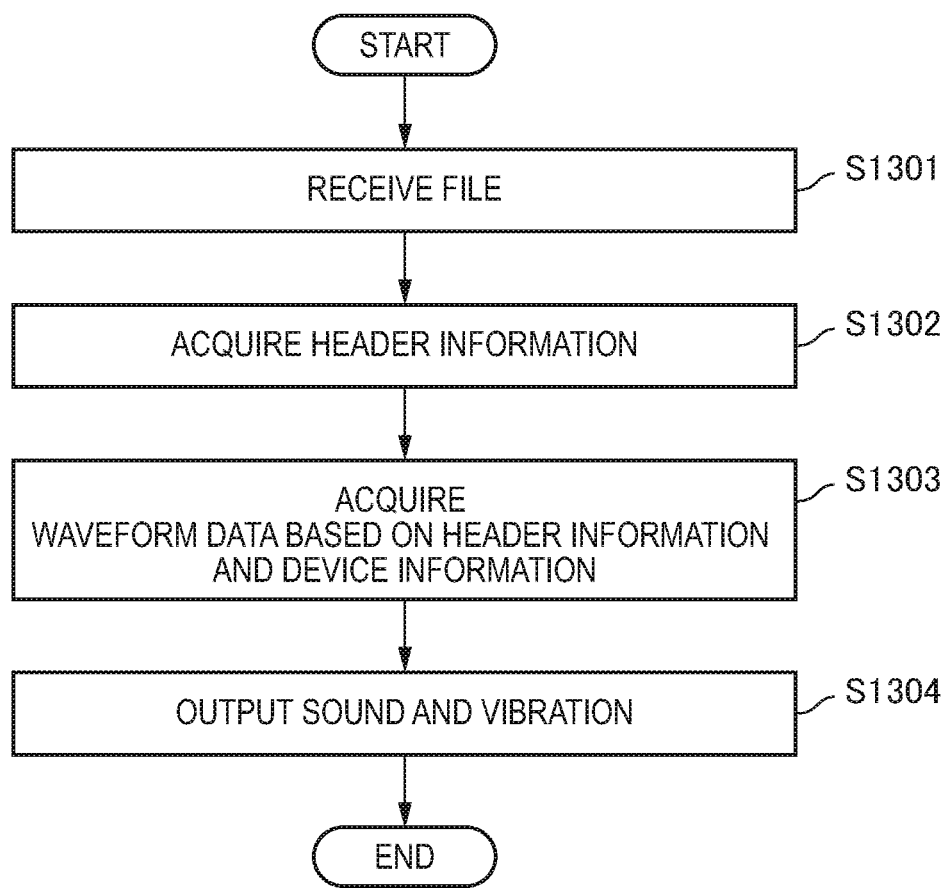
FIG. 14 is a flowchart illustrating an operation of a playback device according to the present embodiment.

The operation of the playback device 20 according to the present embodiment is now described. FIG. 14 is a flowchart illustrating the operation of the playback device 20 according to the present embodiment.

Referring to FIG. 14, initially, the communication unit 230 of the playback device 20 receives the file transmitted from the file generation device 10 (S1301).

Then, the file analysis unit 220 according to the present embodiment acquires header information from the file received in step S1301 (S1302).

Subsequently, the file analysis unit 220 according to the present embodiment specifies a to-be-synthesized band on the basis of the header information acquired in step S1302 and the device information to acquire the speech data and the vibration data (S1303).

Then, the output unit 210 according to the present embodiment outputs sound and vibration on the basis of the speech data and the vibration data acquired in step S1303 (S1304).

2. Hardware Configuration Example

An example of a hardware configuration common to the file generation device 10 and the playback device 20 according to the present disclosure is now described. FIG. 15 is a block diagram illustrating a hardware configuration example of the file generation device 10 and the playback device 20 according to the present disclosure. Referring to FIG. 15, the file generation device 10 and the playback device 20 each includes, in one example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, other components than the components shown here can be further included.

CPU 871

The CPU 871 functions as, in one example, an arithmetic processing unit or a control device, and controls some or all of the operations of each component on the basis of various programs recorded in the ROM 872, the RAM 873, the storage 880, or a removable recording medium 901.

ROM 872 and RAM 873

The ROM 872 is a means for storing programs loaded into the CPU 871, data used for operation, or the like. The RAM 873 temporarily or permanently stores, in one example, a program to be loaded into the CPU 871, various parameters appropriately changing in executing the program, or the like.

Host Bus 874, Bridge 875, External Bus 876, and Interface 877

The CPU 871, the ROM 872, and the RAM 873 are mutually connected via, in one example, the host bus 874 capable of high-speed data transmission. On the other hand, the host bus 874 is connected to the external bus 876 having a relatively low data transmission rate, in one example, via the bridge 875. In addition, the external bus 876 is connected to various components via the interface 877.

Input Device 878

Examples of the input device 878 include a mouse, a keyboard, a touch panel, buttons, a switch, a lever, or the like. Furthermore, examples of the input device 878 include a remote controller capable of transmitting a control signal using infrared rays or other radio waves (hereinafter referred to as a remote controller). In addition, the input device 878 includes an audio input device such as a microphone.

Output Device 879

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like. In addition, the output device 879 according to the present disclosure includes various vibration devices or the like that outputs tactile stimuli.

Storage 880

The storage 880 is a device used to store various types of data. Examples of the storage 880 include a magnetic storage device such as hard disk drives (HDDs), a semiconductor storage device, an optical storage device, a magneto-optical storage device, or the like.

Drive 881

The drive 881 is a device that reads information recorded on the removable recording medium 901 such as a magnetic disk, an optical disk, a magneto-optical disk, or semiconductor memory or writes information to the removable recording medium 901.

Removable Recording Medium 901

Examples of the removable recording medium 901 include a DVD medium, a Blu-ray (registered trademark) medium, an HD DVD medium, various kinds of semiconductor storage media, or the like. Of course, the removable recording medium 901 is preferably, in one example, an IC card or an electronic device mounted with a contactless IC chip.

Connection Port 882

The connection port 882 is a port used for connection with an external connection device 902, such as a universal serial bus (USB) port, an IEEE 1394 port, a small computer system interface (SCSI), an RS-232C port, or an optical speech terminal.

External Connection Device 902

Examples of the external connection device 902 include a printer, a portable music player, a digital camera, a digital moving image camera, an IC recorder, or the like.

Communication Device 883

The communication device 883 is a communication device used for connection with a network, and examples thereof include a communication card for wired or wireless LAN, Bluetooth (registered trademark), or wireless USB (WUSB), a router for optical communication, a router for asymmetric digital subscriber line (ADSL), or a modem for various communications.

3. Concluding Remarks

As described above, the file generation device 10 according to the present disclosure synthesizes speech data including speech waveform data and vibration waveform data, encodes the speech data using a general-purpose format, and so is capable of generating a file including the speech waveform data and the vibration waveform data. In addition, the playback device 20 according to the present disclosure separates the file on the basis of the to-be-synthesized band, so is capable of acquiring and outputting speech data and vibration data. Such a configuration makes it possible to implement unified communication of vibration information while reducing data communication traffic.

The preferred embodiment(s) of the present disclosure has/have been described above with reference to the accompanying drawings, whilst the present disclosure is not limited to the above examples. A person skilled in the art can find various alterations and modifications within the scope of the appended claims, and it should be understood that they will naturally come under the technical scope of the present disclosure.

Further, the respective steps in the processing of the file generation device 10 and the playback device 20 herein are not necessarily processed in chronological order in accordance with the sequences listed in the flowcharts. In one example, the respective steps in the processing of the file generation device 10 and the playback device 20 may be processed in an order different from the sequences described in the flowchart, or may be processed in parallel.

Further, the effects described in this specification are merely illustrative or exemplified effects, and are not limitative. In other words, with or in the place of the above effects, the technology according to the present disclosure can achieve other effects that are clear to those skilled in the art from the description of this specification.

Additionally, the present technology may also be configured as below.

(1)

An information processing apparatus including:

a file generation unit configured to generate a file including speech waveform data and vibration waveform data, in which the file generation unit cuts out waveform data in a to-be-synthesized band from first speech data, synthesizes waveform data extracted from a synthesizing band of vibration data with the to-be-synthesized band to generate second speech data, and encodes the second speech data to generate the file.

(2)

The information processing apparatus according to (1), in which the to-be-synthesized band and the synthesizing band are any band of a predetermined frequency or less.

(3)

The information processing apparatus according to (1) or (2), in which the to-be-synthesized band and the synthesizing band are bass frequency bands of 0 Hz to a predetermined frequency or less.

(4)

The information processing apparatus according to (1), in which the to-be-synthesized band is an ultra-high frequency audible range of a predetermined frequency or more.

(5)
The information processing apparatus according to (4),
in which the file generation unit synthesizes waveform data in a plurality of the synthesizing bands with the to-be-synthesized band.

(6)
The information processing apparatus according to any one of (1) to (5),
in which the file generation unit generates two pieces of the second speech data and encodes the two pieces of the second speech data to generate the file.

(7)
The information processing apparatus according to any one of (1) to (5),
in which the file generation unit generates third speech data by adding waveform data in the to-be-synthesized band cut out from two pieces of the first speech data and synthesizing the added waveform data with the to-be-synthesized band in one of the pieces of the first speech data, synthesizes waveform data in the synthesizing band extracted from the vibration data with the to-be-synthesized band in another one of the pieces of the first speech data to generate the second speech data, and encodes the second speech data and the third speech data to generate the file.

(8)
The information processing apparatus according to any one of (1) to (7), further including:
a communication unit configured to transmit the file.

(9)
The information processing apparatus according to any one of (1) to (8), further including:
a collection unit configured to collect the vibration waveform data.

(10)
An information processing apparatus including:
a file analysis unit configured to acquire speech waveform data and vibration waveform data from a file including the speech waveform data and the vibration waveform data,
in which the file analysis unit separates speech data obtained by decoding the file on the basis of a to-be-synthesized band to acquire the speech waveform data and the vibration waveform data.

(11)
The information processing apparatus according to (10),
in which the file analysis unit specifies the to-be-synthesized band on the basis of header information attached to the file.

(12)
The information processing apparatus according to (11),
in which the file analysis unit specifies the to-be-synthesized band further on the basis of device information.

(13)
The information processing apparatus according to any one of (10) to (12),
in which the file analysis unit extracts two sets of the speech waveform data and the vibration waveform data from two pieces of the speech data obtained by decoding the file.

(14)
The information processing apparatus according to any one of (10) to (12),
in which the file analysis unit extracts a to-be-synthesized band in one of two pieces of the speech data obtained by decoding the file to acquire the vibration waveform data, and
synthesizes waveform data of a to-be-synthesized band duplicated from another one of the pieces of the speech data with the to-be-synthesized band of the one to acquire the speech waveform data.

(15)
The information processing apparatus according to any one of (10) to (14), further including:
a communication unit configured to receive the file.

(16)
The information processing apparatus according to any one of (10) to (15), further including:
an output unit configured to perform output based on the vibration waveform data and the speech waveform data.

(17)
An information processing method including:
generating, by a processor, a file including speech waveform data and vibration waveform data,
in which the generating the file further includes
cutting out waveform data in a to-be-synthesized band from first speech data,
synthesizing waveform data extracted from a synthesizing band of vibration data with the to-be-synthesized band to generate second speech data, and
encoding the second speech data to generate the file.

(18)
A program causing a computer to function as an information processing apparatus including:
a file generation unit configured to generate a file including speech waveform data and vibration waveform data,
in which the file generation unit cuts out waveform data in a to-be-synthesized band from first speech data,
synthesizes waveform data extracted from a synthesizing band of vibration data with the to-be-synthesized band to generate second speech data, and
encodes the second speech data to generate the file.

(19)
An information processing method including:
acquiring, by a processor, speech waveform data and vibration waveform data from a file including the speech waveform data and the vibration waveform data,
in which the acquiring further includes separating speech data obtained by decoding the file on the basis of a to-be-synthesized band to acquire the speech waveform data and the vibration waveform data.

(20)
A program causing a computer to function as an information processing apparatus including:
a file analysis unit configured to acquire speech waveform data and vibration waveform data from a file including the speech waveform data and the vibration waveform data,
in which the file analysis unit separates speech data obtained by decoding the file on the basis of a to-be-synthesized band to acquire the speech waveform data and the vibration waveform data.

REFERENCE SIGNS LIST

10 file generation device
110 collection unit
120 file generation unit
130 communication unit
20 playback device
210 output unit
220 file analysis unit
230 communication unit
30 network

The invention claimed is:
1. An information processing apparatus, comprising:
a central processing unit (CPU) configured to:
cut out waveform data in a to-be-synthesized band from first speech data;

acquire speech waveform data based on the cut out waveform data;
extract vibration waveform data from a synthesizing band of vibration data;
synthesize the extracted vibration waveform data with the to-be-synthesized band to generate second speech data;
encode the second speech data; and
generate a file based on the encoded second speech data, wherein
the generated file includes the speech waveform data and the extracted vibration waveform data,
the generated file is associated with header information, and
the to-be-synthesized band is specified based on the header information.

2. The information processing apparatus according to claim 1, wherein the to-be-synthesized band and the synthesizing band are bands of a specific frequency or less.

3. The information processing apparatus according to claim 1, wherein the to-be-synthesized band and the synthesizing band are bass frequency bands of 0 Hz to a specific frequency.

4. The information processing apparatus according to claim 1, wherein the to-be-synthesized band is a band of 15 kHz or more.

5. The information processing apparatus according to claim 1, wherein the CPU is further configured to:
extract the vibration waveform data from a plurality of synthesizing bands of the vibration data; and
synthesize the vibration waveform data extracted from the plurality of synthesizing bands with the to-be-synthesized band.

6. The information processing apparatus according to claim 1, wherein the CPU is further configured to:
generate two pieces of the second speech data;
encode the two pieces of the second speech data; and
generate the file based on the encoded two pieces of the second speech data.

7. The information processing apparatus according to claim 1, wherein the CPU is further configured to:
cut out the waveform data in the to-be-synthesized band from each of two pieces of the first speech data;
add the cut out waveform data of a first piece of the two pieces of the first speech data with the cut out waveform data of a second piece of the two pieces of the first speech data to generate added waveform data;
synthesize the added waveform data with the to-be-synthesized band in the first piece of the two pieces of the first speech data to generate third speech data;
synthesize the extracted vibration waveform data with the to-be-synthesized band in the second piece of the two pieces of the first speech data to generate the second speech data;
encode the second speech data and the third speech data; and
generate the file based on the encoded second speech data and the encoded third speech data.

8. The information processing apparatus according to claim 1, wherein the CPU is further configured to control transmission of the file.

9. The information processing apparatus according to claim 1, further comprising a vibration sensor configured to collect the vibration data.

10. An information processing method, comprising:
cutting out, by a central processing unit (CPU), waveform data in a to-be-synthesized band from first speech data;
acquiring, by the CPU, speech waveform data based on the cut out waveform data;
extracting, by the CPU, vibration waveform data from a synthesizing band of vibration data;
synthesizing, by the CPU, the extracted vibration waveform data with the to-be-synthesized band to generate second speech data;
encoding, by the CPU, the second speech data; and
generating, by the CPU, a file based on the encoded second speech data, wherein
the generated file includes the speech waveform data and the extracted vibration waveform data,
the generated file is associated with header information, and
the to-be-synthesized band is specified based on the header information.

11. A non-transitory computer-readable medium having stored thereon computer-executable instructions which, when executed by a computer, cause the computer to execute operations, the operations comprising:
cutting out waveform data in a to-be-synthesized band from first speech data;
acquiring speech waveform data based on the cut out waveform data;
extracting vibration waveform data from a synthesizing band of vibration data;
synthesizing the extracted vibration waveform data with the to-be-synthesized band to generate second speech data;
encoding the second speech data; and
generating a file based on the encoded second speech data, wherein
the generated file includes the speech waveform data and the extracted vibration waveform data,
the generated file is associated with header information, and
the to-be-synthesized band is specified based on the header information.

12. An information processing apparatus, comprising:
a central processing unit (CPU) configured to:
cut out waveform data in a to-be-synthesized band from each of two pieces of first speech data;
acquire two pieces of speech waveform data based on the cut out waveform data of each of the two pieces of the first speech data;
add the cut out waveform data of a first piece of the two pieces of the first speech data with the cut out waveform data of a second piece of the two pieces of the first speech data to generate added waveform data;
synthesize the added waveform data with the to-be-synthesized band in the first piece of the two pieces of the first speech data to generate second speech data;
extract vibration waveform data from a synthesizing band of vibration data;
synthesize the extracted vibration waveform data with the to-be-synthesized band in the second piece of the two pieces of the first speech data to generate third speech data;
encode the second speech data and the third speech data; and
generate a file based on the encoded second speech data and the encoded third speech data, wherein the generated file includes the two pieces of the speech waveform data and the extracted vibration waveform data.

13. An information processing apparatus, comprising:
a central processing unit (CPU) configured to:
- specify a to-be-synthesized band based on header information attached to a file, wherein the file includes speech waveform data and vibration waveform data;
- decode the file to obtain speech data; and
- separate the speech data based on the to-be-synthesized band, to acquire the speech waveform data and the vibration waveform data.

14. The information processing apparatus according to claim 13, wherein the CPU is further configured to specify the to-be-synthesized band based on device information associated with the information processing apparatus.

15. The information processing apparatus according to claim 13, wherein the CPU is further configured to:
- obtain two pieces of the speech data based on the decoded file; and
- extract two sets of the speech waveform data and the vibration waveform data from the two pieces of the speech data.

16. The information processing apparatus according to claim 13, wherein the CPU is further configured to:
- obtain two pieces of the speech data based on the decoded file, wherein a first piece of the two pieces of the speech data includes first waveform data in the to-be-synthesized band;
- extract the first waveform data from the to-be-synthesized band of the first piece of the two pieces of the speech data to acquire the vibration waveform data; and
- synthesize, to acquire the speech waveform data, second waveform data of a to-be-synthesized band duplicated from a second piece of the two pieces of the speech data with the to-be-synthesized band of the first piece of the speech data.

17. The information processing apparatus according to claim 13, the CPU is further configured to control reception of the file.

18. The information processing apparatus according to claim 13, the CPU is further configured to control an output device based on the vibration waveform data and the speech waveform data.

19. An information processing method, comprising:
- specifying, by a central processing unit (CPU), a to-be-synthesized band based on header information attached to a file, wherein the file includes speech waveform data and vibration waveform data;
- decoding, by the CPU, the file to obtain speech data; and
- separating, by the CPU, the speech data based on the to-be-synthesized band, to acquire the speech waveform data and the vibration waveform data.

20. A non-transitory computer-readable medium having stored thereon computer-executable instructions which, when executed by a computer, cause the computer to execute operations, the operations comprising:
- specifying a to-be-synthesized band based on header information attached to a file, wherein the file includes speech waveform data and vibration waveform data;
- decoding the file to obtain speech data; and
- separating the speech data based on the to-be-synthesized band, to acquire the speech waveform data and the vibration waveform data.

* * * * *